(12) United States Patent
Azuma et al.

(10) Patent No.: US 10,544,474 B2
(45) Date of Patent: Jan. 28, 2020

(54) HIGH-STRENGTH COLD-ROLLED STEEL SHEET AND METHOD FOR PRODUCING THE SAME

(71) Applicant: NIPPON STEEL & SUMITOMO METAL CORPORATION, Tokyo (JP)

(72) Inventors: Masafumi Azuma, Tokyo (JP); Takayuki Nozaki, Tokyo (JP); Chisato Wakabayashi, Tokyo (JP); Koichi Sato, Tokyo (JP); Hiroyuki Kawata, Tokyo (JP); Nobuhiro Fujita, Tokyo (JP)

(73) Assignee: NIPPON STEEL CORPORATION, Tokyo (JP)

(*) Notice: Subject to any disclaimer, the term of this patent is extended or adjusted under 35 U.S.C. 154(b) by 515 days.

(21) Appl. No.: 14/376,678

(22) PCT Filed: Feb. 4, 2013

(86) PCT No.: PCT/JP2013/052468
§ 371 (c)(1),
(2) Date: Aug. 5, 2014

(87) PCT Pub. No.: WO2013/118679
PCT Pub. Date: Aug. 15, 2013

(65) Prior Publication Data
US 2014/0377582 A1    Dec. 25, 2014

(30) Foreign Application Priority Data
Feb. 8, 2012   (JP) ................. 2012-025268

(51) Int. Cl.
| | |
|---|---|
| *C21D 8/02* | (2006.01) |
| *C25D 7/06* | (2006.01) |
| *C23C 22/07* | (2006.01) |
| *C23C 2/40* | (2006.01) |
| *C23C 2/06* | (2006.01) |
| *C22C 38/00* | (2006.01) |
| *C22C 38/02* | (2006.01) |
| *C22C 38/04* | (2006.01) |
| *C22C 38/06* | (2006.01) |
| *C22C 38/08* | (2006.01) |
| *C22C 38/12* | (2006.01) |
| *C22C 38/14* | (2006.01) |
| *C22C 38/16* | (2006.01) |
| *C22C 38/18* | (2006.01) |
| *C21D 1/76* | (2006.01) |
| *C21D 8/00* | (2006.01) |
| *C23C 2/02* | (2006.01) |
| *C22C 38/42* | (2006.01) |
| *C22C 38/44* | (2006.01) |
| *C22C 38/46* | (2006.01) |
| *C22C 38/48* | (2006.01) |

(Continued)

(52) U.S. Cl.
CPC ............ *C21D 8/005* (2013.01); *C22C 38/001* (2013.01); *C22C 38/002* (2013.01); *C22C 38/005* (2013.01); *C22C 38/02* (2013.01); *C22C 38/04* (2013.01); *C22C 38/06* (2013.01); *C22C 38/42* (2013.01); *C22C 38/44* (2013.01); *C22C 38/46* (2013.01); *C22C 38/48* (2013.01); *C22C 38/50* (2013.01); *C22C 38/58* (2013.01); *C23C 2/02* (2013.01); *C25D 5/36* (2013.01); *C21D 2211/001* (2013.01); *C21D 2211/008* (2013.01); *C21D 2211/009* (2013.01); *Y10T 428/12611* (2015.01); *Y10T 428/12799* (2015.01)

(58) Field of Classification Search
CPC ..................................... B32B 15/00
See application file for complete search history.

(56) References Cited

U.S. PATENT DOCUMENTS

| | | | | |
|---|---|---|---|---|
| 5,525,431 A | * | 6/1996 | Kanamaru | ............ C23C 22/08 148/258 |
| 2004/0261919 A1 | | 12/2004 | Nakajima et al. | |

(Continued)

FOREIGN PATENT DOCUMENTS

| | | |
|---|---|---|
| CA | 2759256 A1 | 12/2010 |
| CA | 2781815 A1 | 6/2011 |

(Continued)

OTHER PUBLICATIONS

English machine translation of Azuma (JP 2011-111675), EPO, accessed Jan. 27, 2017.*
Hasegawa et al., "Effect of microstructure on bendability of 980MPa grade ultra high strength steel sheets", CAMP-ISIJ, vol. 20, 2007, p. 437.
International Search Report for PCT/JP2013/052468 dated May 7, 2013.
Written Opinion of the International Searching Authority for PCT/JP2013/052468 dated May 7, 2013.
English translation of the Korean Office Action, dated Aug. 17, 2015, for Korean Application No. 10-2014-7021641.

(Continued)

*Primary Examiner* — Humera N Sheikh
*Assistant Examiner* — Xiaobei Wang
(74) *Attorney, Agent, or Firm* — Birch, Stewart, Kolasch & Birch, LLP

(57) ABSTRACT

A high-strength cold-rolled steel sheet includes, as a component composition, by mass %: C: 0.075% to 0.300%; Si: 0.30% to 2.50%; Mn: 1.30% to 3.50%; P: 0.001% to 0.050%; S: 0.0001% to 0.0100%; Al: 0.001% to 1.500%; and N: 0.0001% to 0.0100%, in which a surface microstructure contains residual austenite of 3% to 10% and ferrite of 90% or less by volume fraction, an inner microstructure at a depth of t/4 from the surface assuming that a sheet thickness is t contains residual austenite of 3% to 20% by volume fraction, a ratio Hvs/Hvb between a surface hardness Hvs of the steel sheet surface and a hardness Hvb at a depth of ¼ of the thickness is more than 0.75 to 0.90, and a maximum tensile strength is 700 MPa or more.

22 Claims, No Drawings

(51) Int. Cl.
*C22C 38/50* (2006.01)
*C22C 38/58* (2006.01)
*C25D 5/36* (2006.01)

(56) References Cited

U.S. PATENT DOCUMENTS

| | | | |
|---|---|---|---|
| 2008/0000555 | A1 | 1/2008 | Nonaka et al. |
| 2012/0222781 | A1* | 9/2012 | Azuma .............. C21D 9/46 |
| | | | 148/518 |
| 2013/0037180 | A1* | 2/2013 | Sano .............. C21D 8/0436 |
| | | | 148/603 |

FOREIGN PATENT DOCUMENTS

| | | | |
|---|---|---|---|
| CA | 2787575 A1 | | 8/2011 |
| CN | 1625608 A | | 6/2005 |
| EP | 1808505 A1 | | 7/2007 |
| EP | 2738280 A1 | | 6/2014 |
| EP | 2762589 A1 | | 8/2014 |
| JP | 2-175839 A | | 7/1990 |
| JP | 5-195149 A | | 8/1993 |
| JP | 2005-298964 A | | 10/2005 |
| JP | 2007-16319 A | | 1/2007 |
| JP | 2007-211280 A | | 8/2007 |
| JP | 2009-215616 A | | 9/2009 |
| JP | 2009-270126 A | | 11/2009 |
| JP | 2010-59452 A | | 3/2010 |
| JP | 2010-65269 A | | 3/2010 |
| JP | 2010-70843 A | | 4/2010 |
| JP | 2011-111675 A | | 6/2011 |
| JP | 2011-179030 A | | 9/2011 |
| JP | 2011-231367 A | | 11/2011 |
| KR | 10-2002-0068529 A | | 8/2002 |
| TW | I305232 B | | 1/2009 |
| WO | WO2011/065591 | * | 6/2011 |
| WO | WO2011/093319 | * | 8/2011 .......... C21D 8/0436 |

OTHER PUBLICATIONS

Extended European Search Report, dated Feb. 18, 2016, for European Application No. 13747093.6.
Taiwanese Office Action and Search Report for Taiwanese Application No. 102103962, dated Jul. 7, 2014, with an English translation.
Chinese Office Action and Search Report for Chinese Application No. 201380008324.3, dated Sep. 29, 2015, with an English translation of the Search Report only.
Chinese Office Action and Search Report dated Nov. 28, 2016, for Chinese Application No. 201380008324.3, with English translation.

* cited by examiner

HIGH-STRENGTH COLD-ROLLED STEEL SHEET AND METHOD FOR PRODUCING THE SAME

TECHNICAL FIELD OF THE INVENTION

The present invention relates to a high-strength cold-rolled steel sheet having excellent bendability and a method for producing the same. The high-strength cold-rolled steel sheet includes steel sheets having a surface on which a coating film or galvanizing is formed.

Priority is claimed on Japanese Patent Application No. 2012-025268, filed on Feb. 8, 2012, the content of which is incorporated herein by reference.

RELATED ART

In recent years, there have been increasing demands for higher strength of a plated steel sheet used in automobiles or the like. In response to the demands, a high-strength steel sheet with a maximum tensile stress of 700 MPa or more is being used. As a method for forming a vehicle body or a part of an automobile using such a high-strength steel sheet, there is bending such as press working. Generally, the more the strength of a steel sheet is increased, the more the bendability worsens. Thus, when bending is performed on a high-strength steel sheet, there have been problems such as occurrence of cracks inside a steel sheet at a deformation portion, occurrence of necking on the surface of a steel sheet, and the like.

There have been known that (a) difficulties of necking occurring, and (b) difficulties of cracking (voids) occurring inside a steel sheet are important factors which govern the bendability of a high-strength steel sheet (for example, refer to Non-patent Document 1). For example, since necking occurs easily and deformation is localized in a steel sheet having low elongation during bending, the bending workability is deteriorated. In addition, in steel including ferrite and martensite, bendability is deteriorated due to cracking of the martensite or void formation at the interface. As a result, high-strengthening causes deterioration in elongation and thus, bendability is worsened. In addition, sine an increase in the volume fraction of the martensite is accompanied with high-strengthening in some cases, the high-strengthening easily causes deterioration in bendability.

As a technique for improving bendability of a steel sheet, Patent Document 1 proposes a steel sheet including as a component composition, by mass %, C: more than 0.02% to 0.20%, Si: 0.01% to 2.0%, Mn: 0.1% to 3.0%, P: 0.003% to 0.10%, S: 0.020% or less, Al: 0.001% to 1.0%, N: 0.0004% to 0.015%, and Ti: 0.03% to 0.2%, and a balance consisting of Fe and impurities. A metallographic structure of the steel sheet includes 30% to 95% of ferrite by area fraction, a second phase of the balance is composed of one or more of martensite, bainite, pearlite, cementite, and residual austenite, an area fraction of the martensite is 0% to 50% when the martensite is included, and the steel sheet includes Ti-based carbonitride precipitates with a grain diameter of 2 nm to 30 nm and an average interparticle distance of 30 nm to 300 nm and includes a crystallized TiN with a grain diameter of 3 μm or more and an average interparticle distance of 50 μm to 500 μm.

According to such a steel sheet, satisfactory bendability can be obtained. However, since precipitation strengthening is utilized, it is not easy to secure the balance between the strength and the elongation at a high level.

Further, Patent Document 2 describes, as a steel sheet having excellent bendability, a steel sheet including, as a component composition, by mass %, C: 0.03% to 0.11%, Si: 0.005% to 0.5%, Mn: 2.0% to 4.0%, P: 0.1% or less, S: 0.01% or less, sol. Al: 0.01% to 1.0%, N: 0.01% or less, and further including one or both of Ti: 0.50% or less and Nb: 0.50% or less in the range satisfying Ti+(Nb/2)≤0.03, and a balance consisting of Fe and impurities, in which a tensile strength is 540 MPa or more. The steel sheet has an average interval of 300 μm or less in a sheet width direction of an Mn concentrated portion extending in a rolling direction at a depth of t/20 (t: sheet thickness of the steel sheet) from a surface, an area fraction of ferrite of 60% or more, and an average grain diameter of ferrite of 1.0 μm to 6.0 μm and includes 100 or more precipitates with a grain diameter of 1 nm to 10 nm per $m^2$ in ferrite. According to such a steel sheet, satisfactory bendability can be obtained. However, since the primary phase is ferrite and the volume fraction of the residual austenite is limited to less than 3%, the application to a high-strength steel sheet of 700 MPa or more is not easy.

Further, Patent Document 3 describes, as a steel sheet having both ductility and bendability, a steel sheet including, as a component composition, by mass %, C: 0.08% to 0.25%, Si: 0.7% or less, Mn: 1.0% to 2.6%, Al: 1.5% or less, P: 0.03% or less, S: 0.02% or less and N: 0.01% or less, and having a relation between Si and Al satisfying 1.0%≤Si+Al≤1.8% with a balance being consisting of Fe and impurities. The steel sheet has mechanical properties satisfying TS≥590 (TS: tensile strength (MPa)), TS×El≥17500 (El: total elongation (%)), and ρ≤1.5×t (ρ: limit bend radius (mm), t: sheet thickness (mm)). However, it is not easy to attain both ductility and bendability at a high level and also the application to a high-strength steel sheet of 900 MPa or more is not easy.

Patent Document 4 describes, as a steel sheet having satisfactory ductility and bendability, a steel sheet including, as a component composition, by mass %, C: 0.08% to 0.20%, Si: 1.0% or less, Mn: 1.8% to 3.0%, P: 0.1% or less, S: 0.01% or less, sol. Al: 0.005 to 0.5%, N: 0.01% or less, Ti: 0.02% to 0.2%, and a balance consisting of Fe and impurities. The steel sheet has a steel structure constituted of, by volume %, ferrite: 10% or more, bainite: 20% to 70%, residual austenite: 3% to 20% and martensite: 0% to 20% in which an average grain diameter of the ferrite is 10 μm or less, an average grain diameter of the bainite is 10 μm or less, an average grain diameter of the residual austenite is 3 μm or less, and an average grain diameter of the martensite is 3 μm or less. Further, the steel sheet has mechanical properties such that a tensile strength (TS) is 780 MPa or more, a product (TS×El value) of tensile strength (TS) and total elongation (El) is 14000 MPa·% or more, and a minimum bend radius in a bending test is 1.5t or less (t: sheet thickness), and has a sheet thickness of 2.0 mm or more. According to the technology described in Patent Document 4, it is possible to secure satisfactory ductility and bendability. However, it is not easy to attain both strength and bendability at a high level.

Patent Document 5 describes, as a steel sheet having excellent bendability, a steel sheet including, as a component composition, by mass %, C: 0.03% to 0.12%, Si: 0.02% to 0.50%, Mn: 2.0% to 4.0%, P: 0.1% or less, S: 0.01% or less, sol. Al: 0.01% to 1.0%, N: 0.01% or less, and further including one or both of Ti: 0.50% or less and Nb: 0.50% or less in the range satisfying Ti+(Nb/2)≥0.03, and a balance consisting of Fe and impurities, in which a tensile strength is 540 MPa or more. The steel sheet has a structure such that an area fraction of ferrite is 60% or more and an average grain size of ferrite is 1.0 µm to 6.0 µm. A galvannealed layer contains, by mass %, Fe: 8% to 15%, Al: 0.08% to 0.50%, and a balance consisting of Zn and impurities. However, since the amount of C is limited to 0.12% or less within a low range, the application to a steel sheet of 780 MPa or less cannot be made, and the application to a higher-strength steel sheet is not easy. Further, since the area fraction of the residual austenite is less than 3%, it is not easy to obtain excellent ductility.

Patent Document 6 describes, as a steel sheet having excellent workability, a steel sheet including, by mass %, C: 0.03% to 0.17%, Si: 0.01% to 0.75%, Mn: 1.5% to 2.5%, P: 0.080% or less, S: 0.010% or less, sol. Al: 0.01% to 1.20%, Cr: 0.3% to 1.3%, and a balance consisting of Fe and unavoidable impurities. The steel sheet has a structure constituted of, by volume fraction, ferrite of 30% to 70%, residual austenite of less than 3%, and martensite of the balance, in which 20% or more of the martensite is tempered martensite. However, since the volume fraction of the martensite is limited to less than 3%, the bendability is excellent but there has been a problem of uniform elongation being low. As a result, when bending is performed on a thick sheet, there is a concern of cracking caused by necking occurring on the surface of the steel sheet in the bending.

Patent Document 7 describes, as a steel sheet having excellent bending workability, a steel sheet including, by wt %, C: 0.12% to 0.30%, Si: 1.2% or less, Mn: 1% to 3%, P: 0.020% or less, S: 0.010% or less, sol. Al: 0.01% to 0.06%, and a balance consisting of Fe and unavoidable impurities. The steel has a soft layer of C: 0.1 wt % or less in a surface part on both surfaces by 3 vol % to 15 vol % per surface with a balance consisting of a complex structure of residual austenite of less than 10 vol % and a low-temperature transformation phase or further, ferrite. However, decarburization annealing has to be performed for a total of two times after hot rolling and after cold rolling to form the soft layer on the steel sheet surface, and thus, there has been a problem of deterioration in productivity.

PRIOR ART DOCUMENT

Patent Document

[Patent Document 1] Japanese Unexamined Patent Application, First Publication No. 2007-16319
[Patent Document 2] Japanese Unexamined Patent Application, First Publication No. 2009-215616
[Patent Document 3] Japanese Unexamined Patent Application, First Publication No. 2009-270126
[Patent Document 4] Japanese Unexamined Patent Application, First Publication No. 2010-59452
[Patent Document 5] Japanese Unexamined Patent Application, First Publication No. 2010-65269
[Patent Document 6] Japanese Unexamined Patent Application, First Publication No. 2010-70843
[Patent Document 7] Japanese Unexamined Patent Application, First Publication No. H5-195149

Non-Patent Document

[Non-Patent Document 1] CAMP-ISIJ, Vol. 20, 2007, p. 437, Hasegawa et al.

DISCLOSURE OF THE INVENTION

Problems to be Solved by the Invention

As described above, in the related art, when a high-strength cold-rolled steel sheet is particularly subjected to bending, sufficient bendability cannot be obtained, and thus, further improvement of bendability has been required. In view of the above situations, the present invention is to provide a high-strength cold-rolled steel sheet having excellent bendability and a method for producing the same.

Means for Solving the Problem

The summary of the present invention is described as follows.

(1) According to a first aspect of the present invention, there is provided a high-strength cold-rolled steel sheet including by mass %: C: 0.075% to 0.300%; Si: 0.30% to 2.50%; Mn: 1.30% to 3.50%; P: 0.001% to 0.050%; S: 0.0001% to 0.0100%; Al: 0.001% to 1.500%; N: 0.0001% to 0.0100%; Ti: limited to 0.150% or less; Nb: limited to 0.150% or less; V: limited to 0.150% or less; Cr: limited to 2.00% or less; Ni: limited to 2.00% or less; Cu: limited to 2.00% or less; Mo: limited to 1.00% or less; W: limited to 1.00% or less; one or more of Ca, Ce, Mg, Zr, Hf and REM, wherein a total amount of the one or more of Ca, Ce, Mg, Zr, Hf and REM is 0.5000% or less; and a balance comprising Fe and unavoidable impurities, in which a surface microstructure, which is a microstructure in a surface of the steel sheet contains 3% to 10% of residual austenite and 90% or less ferrite by volume fraction, an inner microstructure, which is a microstructure at a depth of t/4, wherein t represents a sheet thickness, and which is different from the surface microstructure, contains 3 to 30% residual austenite by volume fraction, a ratio Hvs/Hvb between a surface hardness Hvs of the steel sheet surface and a hardness Hvb at a depth of t/4 satisfies: $0.75 < Hvs/Hvb \le 0.90$, and a maximum tensile strength is 700 MPa or more.

(2) In the high-strength cold-rolled steel sheet according to (1), the surface microstructure may further contain 10% to 87% of ferrite, 10% to 50% of tempered martensite, and fresh martensite limited to 15% or less by volume fraction.

(3) In the high-strength cold-rolled steel sheet according to (1) or (2), the inner microstructure may further contain 10% to 87% of ferrite, 10% to 50% of tempered martensite, and fresh martensite limited to 15% or less by volume fraction.

(4) In the high-strength cold-rolled steel sheet according to any one of (1) to (3), a coating film including an oxide containing phosphorus may be formed on at least one surface.

(5) In the high-strength cold-rolled steel sheet according to any one of (1) to (3), an electrogalvanized layer may be formed on at least one surface.

(6) In the high-strength cold-rolled steel sheet according to (5), a coating film including an oxide containing phosphorus may be formed on the electrogalvanized layer.

(7) In the high-strength cold-rolled steel sheet according to any one of (1) to (3), a galvanized layer may be formed on at least one surface.

(8) In the high-strength cold-rolled steel sheet according to (7), a coating film including an oxide containing phosphorus may be formed on the galvanized layer.

(9) In the high-strength cold-rolled steel sheet according to any one of (1) to (3), a galvannealed layer may be formed on at least one surface.

(10) In the high-strength cold-rolled steel sheet according to (9), a coating film including an oxide containing phosphorus may be formed on the galvannealed layer.

(11) According to a second aspect of the present invention, there is provided a method for producing a cold-rolled steel sheet including: heating a slab to 1050° C. or higher, the slab comprising, by mass %, C: 0.075% to 0.300%; Si: 0.30% to 2.50%; Mn: 1.30% to 3.50%; P: 0.001% to 0.050%; S: 0.0001% to 0.0100%; Al: 0.001% to 1.500%; N: 0.0001% to 0.0100%; Ti: limited to 0.150% or less; Nb: limited to 0.150% or less; V: limited to 0.150% or less; Cr: limited to 2.00% or less; Ni: limited to 2.00% or less; Cu: limited to 2.00% or less; Mo: limited to 1.00% or less; W: limited to 1.00% or less; one or more of Ca, Ce, Mg, Zr, Hf and REM, wherein a total amount of the one or more of Ca, Ce, Mg, Zr, Hf and REM is 0.5000% or less; and a balance comprising Fe and unavoidable impurities, performing hot rolling at a finish rolling temperature set to an Ar3 transformation point or higher and then coiling in a temperature range of 750° C. or lower to obtain a hot-rolled steel sheet; cold-rolling the hot-rolled steel sheet under a reduction of 30% to 80% to obtain a cold-rolled steel sheet; and annealing the cold-rolled steel sheet in a temperature range of (Ac1 transformation point +40)° C. to (Ac3 transformation point +50)° C. in an atmosphere in which log (water partial pressure/hydrogen partial pressure) is −3.0 to 0.0 for 20 seconds to 600 seconds, cooling the steel sheet to a temperature range of 100-300° C. so that a cooling rate is 0.5-500° C./sec of in a temperature range of 700-500° C., and then, holding the steel sheet at 350° C. to 500° C. for 10 seconds to 1000 seconds to obtain a high-strength cold-rolled steel sheet.

(12) The method for producing a cold-rolled steel sheet according to (11) may further include forming a coating film including an oxide containing phosphorus on at least one surface of the high-strength cold-rolled steel sheet.

(13) The method for producing a cold-rolled steel sheet according to (11) may further include forming an electrogalvanized layer on at least one surface of the high-strength cold-rolled steel sheet.

(14) The method for producing a cold-rolled steel sheet according to (13) may further include forming a coating film including an oxide containing phosphorus on the electrogalvanized layer.

(15) The method for producing a cold-rolled steel sheet according to (11) may further include forming a galvanized layer on at least one surface of the high-strength cold-rolled steel sheet, and in the forming of the galvanized layer, the high-strength cold-rolled steel sheet may be immersed in a galvanizing bath, wherein the immersion temperature of the cold-rolled steel sheet is in a temperature range of (galvanizing bath temperature −40)° C. to (galvanizing bath temperature +50)° C., and cooled.

(16) The method for producing a cold-rolled steel sheet according to (15) may further include forming a coating film including an oxide containing phosphorus on the galvanized layer.

(17) The method for producing a cold-rolled steel sheet according to (11) may further include forming a galvannealed layer on at least one surface of the high-strength cold-rolled steel sheet, and in the forming of the galvannealed layer, the high-strength cold-rolled steel sheet may be immersed in a galvanizing bath, wherein the immersion temperature of the cold-rolled steel sheet is in a temperature range of (galvanizing bath temperature −40)° C. to (galvanizing bath temperature +50)° C., subjected to alloying at a temperature of 460° C. or higher, and then, cooled.

(18) The method for producing a cold-rolled steel sheet according to (17) may further include forming a coating film including an oxide containing phosphorus on the galvannealed layer.

Effects of the Invention

According to the present invention, it is possible to provide a high-strength cold-rolled steel sheet having excellent bendability and a maximum tensile strength of 700 MPa or more and a method for producing the same.

EMBODIMENTS OF THE INVENTION

The present inventors have conducted intensive studies in order to obtain a high-strength cold-rolled steel sheet having a maximum tensile strength of 700 MPa or more by which excellent bendability can be obtained by preventing cracking occurring inside a steel sheet, and necking of the surface of a steel sheet caused by a deformation portion when bending is performed.

As a result, the present inventors have found that a steel sheet surface can be softened by containing a predetermined component composition, controlling a microstructure to be changed to a predetermined structure, and performing decarburization and thus, excellent bendability can be obtained similar to a low-strength steel sheet even in a case of a high-strength steel sheet having a maximum tensile strength of 700 MPa or more. The effect thereof can be obtained when a ratio between the hardness of the steel sheet surface and the hardness at a depth of t/4"(surface hardness)/(hardness at a depth of t/4)" satisfies: $0.75 < Hvs/Hvb \leq 0.90$.

In addition, since the microstructure of the surface part of the steel sheet contains 3% to 10% residual austenite and 90% or less ferrite by volume fraction, and the inner microstructure at a depth of t/4 of the steel sheet contains 3% to 30% residual austenite of by volume fraction, cracking caused by necking can be suppressed, and further improvement of bendability can be obtained. Particularly, as the location becomes closer to the surface part, the strain becomes larger in the bending. Thus, a significant improvement effect of bendability can be obtained by allowing the hardness of the surface and the inside of the steel sheet to fall within the above-described range.

The steel sheet of the present invention also has satisfactory elongation since a necking suppressing effect in bending and a necking suppressing effect in a tensile test and press working can be obtained by containing residual austenite.

Hereinafter, an embodiment of a high-strength cold-rolled steel sheet of the present invention will be described.

In the following description, a steel sheet having excellent bendability refers to a steel sheet in which cracking and necking do not occur at a bend radius R of 1.0 mm or less, or a steel sheet in which cracking does not occur at a bend radius R of 0.5 mm or less in a 90-degree V bending test according to JIS Z 2248 (2006).

(Component Composition of Steel)

First, a component composition of steel constituting a cold-rolled steel sheet or a galvanized steel sheet according to the embodiment will be described. Note that % in the following description is mass %.

"C: 0.075% to 0.300%"

C is contained for increasing strength of the base steel sheet. However, when the C content is more than 0.300%, the elongation property and weldability becomes insufficient, and thus, it is difficult to secure high bendability. The C content is preferably 0.280% or less, and more preferably 0.260% or less. On the other hand, when the C content is less than 0.075%, the strength is decreased and it is not possible to ensure the maximum tensile strength of 700 MPa or more.

In order to increase the strength, the C content is preferably 0.090% or more, and more preferably 0.100% or more.

"Si: 0.30% to 2.50%"

Si facilitates a decarbonizing reaction to soften the steel sheet surface, and thus, Si is the most important element. When the Si content is more than 2.50%, the base steel sheet becomes brittle and the ductility is deteriorated. Thus, the upper limit is set to 2.50%. From the viewpoint of ductility, the Si content is preferably 2.20% or less, and more preferably 2.00% or less. On the other hand, when the Si content is less than 0.30%, a large amount of coarse iron-based carbides is generated and the fraction of residual austenite of the inner microstructure cannot be set to 3% to 30%, thereby deteriorating elongation. From this viewpoint, the lower limit of Si is preferably 0.50% or more, and more preferably 0.70% or more. In addition, Si is an element necessary for suppressing coarsening of the iron-based carbides in the base steel sheet to improve the strength and formability. Further, Si is necessary to be added as a solid-solution strengthening element to contribute to increase the strength of the steel sheet. From this viewpoint, the lower limit of Si is preferably set to 1% or more, and more preferably 1.2% or more.

"Mn: 1.30% to 3.50%"

Mn is contained for increasing strength of the base steel sheet. However, when the Mn content is more than 3.50%, a coarse Mn concentrated portion is generated in a sheet thickness center portion of the base steel sheet, embrittlement occurs easily, and a problem such as cracking of a cast slab occurs easily. Further, when the Mn content is more than 3.50%, the weldability also is deteriorated. Therefore, the Mn content is set to 3.50% or less. From the viewpoint of weldability, the Mn content is preferably 3.20% or less, and more preferably 3.00% or less. On the other hand, when the Mn content is less than 1.30%, a large amount of soft structures is formed during cooling after annealing, and thus it becomes difficult to ensure the maximum tensile strength of 700 MPa or more. Thus, the Mn content is set to 1.30% or more. The Mn content is, for further increasing the strength, preferably 1.50% or more, and more preferably 1.70% or more.

"P: 0.001% to 0.050%"

P tends to segregate in the sheet thickness center portion of the base steel sheet, and embrittles a weld zone. When the P content is more than 0.050%, the weld zone becomes quite brittle, and thus the P content is limited to 0.050% or less. Although the effects of the present invention are exhibited without particularly setting the lower limit of the P content, setting the P content to less than 0.001% accompanies a large increase in manufacturing costs, and thus 0.001% is set as the lower limit value.

"S: 0.0001% to 0.0100%"

S adversely affects weldability and manufacturability during casting and hot rolling. Thus, the upper limit value of the S content is set to 0.0100% or less. Further, S couples with Mn to form coarse MnS and decreases ductility and stretch flangeability. Thus, the S content is preferably 0.0050% or less, and more preferably 0.0025% or less. The effects of the present invention are exhibited without particularly setting the lower limit of the S content. However, setting the S content to less than 0.0001% accompanies a large increase in manufacturing costs, and thus setting the S content to 0.0001% is set as the lower limit value.

"Al: 0.001% to 1.500%"

Al facilitates a decarbonizing reaction to soften the steel sheet surface, and thus, Al is the most important element. However, when the Al content is more than 1.500%, weldability is deteriorated, and thus, the upper limit of Al content is set to 1.500%. From this viewpoint, the Al content is preferably 1.200% or less, and more preferably 0.900% or less. Further, although Al is an effective element as a deoxidizing material, when the Al content is less than 0.001%, the effect as the deoxidizing material cannot be obtained sufficiently, and thus, the lower limit of the Al content is set to 0.001% or more. In order to obtain the deoxidizing effect sufficiently, the Al content is preferably 0.003% or more.

"N: 0.0001% to 0.0100%"

N forms a coarse nitride and deteriorates ductility and stretch flangeability, and thus, the amount of N added needs to be suppressed. When the N content is more than 0.0100%, this tendency becomes significant, and thus the upper limit value of the N content is set to 0.0100% or less. Further, N causes generation of a blow hole during welding, and thus, the N content is preferably 0.0080% or less. Although the effects of the present invention are exhibited without particularly setting the lower limit of the N content, setting the N content to less than 0.0001% accompanies a large increase in manufacturing costs, and thus, 0.0001% is set as the lower limit value.

The base steel sheet of the high-strength cold-rolled steel sheet according to the embodiment contains the above-mentioned elements and the balance consisting of Fe and unavoidable impurities as a base structure, and other elements may not be added. However, the steel sheet may further contain, as required, Ti, Nb, V, Cr, Ni, Cu, Mo, W, Ca, Ce, Mg, Zr, Hf, and REM within the following content range. The lower limits of these elements are 0%. However, in order to obtain a desired effect, the lower limits of these elements may be the lower limits shown below, respectively. In addition, the content of unavoidable impurities is allowable within the range of not significantly deteriorating the effects of the present invention, but it is preferable to reduce the content as much as possible.

"Ti: 0.005% to 0.150%"

Ti is an element which contributes to increasing strength of the base steel sheet by precipitate strengthening, fine grain strengthening by growth suppression of ferrite crystal grains, and dislocation strengthening through suppression of recrystallization. However, when the Ti content is more than 0.150%, precipitation of the carbonitride increases and formability deteriorates, and thus, the Ti content is preferably 0.150% or less. From the viewpoint of formability, the Ti content is more preferably 0.120% or less, and still more preferably 0.100% or less. Although the effects of the present invention are exhibited without particularly setting the lower limit of the Ti content, the Ti content is preferably 0.005% or more to sufficiently obtain the strength increasing effect of Ti. To increase strength of the base steel sheet, the Ti content is more preferably 0.010% or more, and still more preferably 0.015% or more.

"Nb: 0.005% to 0.150%"

Nb is an element which contributes to increasing strength of the base steel sheet by precipitate strengthening, fine grain strengthening by growth suppression of ferrite crystal grains, and dislocation strengthening through suppression of recrystallization. However, when the Nb content is more than 0.150%, precipitation of the carbonitride increases and formability deteriorates, and thus the Nb content is preferably 0.150% or less. From the viewpoint of formability, the Nb content is more preferably 0.120% or less, and still more preferably 0.100% or less. Although the effects of the present invention are exhibited without particularly setting the lower limit of the Nb content, the Nb content is preferably 0.005% or more so as to sufficiently obtain the strength increasing effect of Nb. To increase strength of the base steel sheet, the Nb content is preferably 0.010% or more, and still more preferably 0.015% or more.

"V: 0.005% to 0.150%"

V is an element which contributes to increasing strength of the base steel sheet by precipitate strengthening, fine grain strengthening by growth suppression of ferrite crystal grains, and dislocation strengthening through suppression of recrystallization. However, when the V content is more than 0.150%, precipitation of the carbonitride increases and formability deteriorates, and thus the V content is preferably 0.150% or less. Although the effects of the present invention are exhibited without particularly setting the lower limit of the V content, the V content is preferably 0.005% or more so as to sufficiently obtain the strength increasing effect of V.

"Cr: 0.01% to 2.00%"

Cr suppresses phase transformation at high temperature and is an element effective for increasing strength, and may be added in place of part of C and/or Mn. When the Cr content is more than 2.00%, workability during hot working is impaired and productivity decreases, and thus, the Cr content is preferably 2.00% or less. Although the effects of the present invention are exhibited without particularly setting the lower limit of the Cr content, the Cr content is preferably 0.01% or more so as to sufficiently obtain the effect of strength increase by Cr.

"Ni: 0.01% to 2.00%"

Ni suppresses phase transformation at high temperature and is an element effective for increasing strength, and may be added in place of part of C and/or Mn. When the Ni content is more than 2.00%, weldability is impaired, and thus, the Ni content is preferably 2.00% or less. Although the effects of the present invention are exhibited without particularly setting the lower limit of the Ni content, the Ni content is preferably 0.01% or more so as to sufficiently obtain the effect of strength increase by Ni.

"Cu: 0.01% to 2.00%"

Cu is an element which increases strength by existing as fine particles in steel, and can be added in place of part of C and/or Mn. When the Cu content is more than 2.00%, weldability is impaired, and thus, the Cu content is preferably 2.00% or less. Although the effects of the present invention are exhibited without particularly setting the lower limit of the Cu content, the Cu content is preferably 0.01% or more so as to sufficiently obtain the effect of strength increase by Cu.

"Mo: 0.01% to 1.00%"

Mo suppresses phase transformation at high temperature and is an element effective for increasing strength, and may be added in place of part of C and/or Mn. When the Mo content is more than 1.00%, workability during hot working is impaired and productivity decreases, and thus, the Mo content is preferably 1.00% or less. Although the effects of the present invention are exhibited without particularly setting the lower limit of the Mo content, the Mo content is preferably 0.01% or more so as to sufficiently obtain the effect of strength increase by Mo.

"W: 0.01% to 1.00%"

W suppresses phase transformation at high temperature and is an element effective for increasing strength, and may be added in place of part of C and/or Mn. When the W content is more than 1.00%, workability during hot working is impaired and productivity decreases, and thus, the W content is preferably 1.00% or less. Although the effects of the present invention are exhibited without particularly setting the lower limit of the W content, the W content is preferably 0.01% or more so as to sufficiently obtain the effect of strength increase by W.

"0.0001% to 0.5000% in total of at least one of Ca, Ce, Mg, Zr, Hf, and REM"

Ca, Ce, Mg, Zr, Hf, and REM are elements effective for improving formability, and one or two or more of these elements may be added. However, on the contrary when a total content of at least one of Ca, Ce, Mg, Zr, Hf, and REM is more than 0.5000%, it is possible that ductility is impaired. Accordingly, the total content of each element is preferably 0.5000% or less. Although the effects of the present invention are exhibited without particularly setting the lower limit of the total content of at least one of Ca, Ce, Mg, Zr, Hf, and REM, the total content of each element is preferably 0.0001% or more so as to sufficiently obtain the effect of improving formability of the base steel sheet. From the viewpoint of formability, the total content of one or two or more of Ca, Ce, Mg, Zr, Hf, and REM is more preferably 0.0005% or more, and still more preferably 0.0010% or more.

Note that REM is an abbreviation of Rare Earth Metal and refers to an element belonging to the lanthanoid series. REM or Ce is often added in misch metal, and may contain elements of the lanthanoid series other than La and Ce in a complex form. The effects of the present invention are exhibited even when elements of the lanthanoid series other than La and Ce are contained as unavoidable impurities. Further, the effects of the present invention are exhibited even when metals La and Ce are added.

(Inner Microstructure)

Next, an inner microstructure will be described. Here, the inner microstructure means a microstructure at a depth of t/4 assuming that the sheet thickness of the base steel sheet is t. In addition, the surface microstructure, which will be described later, refers to a microstructure in the surface of the base steel sheet, exactly, in a surface which is parallel to the sheet surface of the base steel sheet and positioned at a depth of 20 μm from the surface.

"Residual Austenite of Inner Microstructure: 3% to 30%"

The inner microstructure of the steel sheet contains residual austenite of 3% or 30% by volume fraction in a depth range of t/8 to 3t/8 with the depth of t/4 being a center. The residual austenite has a necking suppressing effect during bending by significantly improving ductility. On the other hand, the residual austenite becomes a fracture origin, and thus, deteriorates bendability. Therefore, it is preferable that the volume fraction of the residual austenite in the microstructure of the base steel sheet be 3% to 20%. The lower limit of the residual austenite in the inner microstructure is preferably 5% or 8% or more.

"Residual Austenite of Surface Microstructure: 3% to 10%"

"Ferrite of Surface Microstructure: 90% or Less"

In order to obtain more excellent bendability, the fraction of residual austenite in the steel sheet surface part is limited to 3% to 10%, and the fraction of ferrite is limited to 90% or less. When the fraction of the residual austenite in the surface is less than 3%, for example, necking occurs in the surface part at a bend radius R of 1.0 mm or less in a 90-degree V bending test, and bendability is deteriorated. Thus, the fraction of the residual austenite in the steel sheet surface needs to be 3% or more. On the other hand, since the residual austenite is transformed into martensite during bending to become a crack origin, it is necessary to reduce the fraction of austenite in the surface of the steel sheet by performing decarburization. Even when the fraction of fresh martensite is reduced to 15% or less, deterioration of bendability having martensite, which is generated by the transformation of the residual austenite into martensite, as a starting point is unavoidable. Thus, the fraction of the residual austenite in the surface part of the steel sheet is set to 10% or less, preferably 8% or less, and more preferably 5.8% or less.

Since the fraction of the residual austenite in the inner microstructure and the surface microstructure of the steel sheet falls within the above range, it is possible that a hardness ratio between the surface part of the steel sheet, which will be described later, and the inside of the steel sheet (at a depth of t/4) satisfies 0.75<Hvs/Hvb≤0.90, wherein Hvs represents the surface hardness of the steel sheet surface and Hvb represents a hardness at a depth of t/4, and also excellent bendability can be obtained.

When the fraction of the ferrite in the surface microstructure is more than 90%, it is difficult to secure a predetermined fraction of the residual austenite, and excellent bendability cannot be secured. Thus, 90% is set as the upper limit.

Further, the surface microstructure and the inner microstructure of the high-strength cold-rolled steel sheet according to the embodiment may contain respectively one or more of tempered martensite, ferrite, pearlite, and cementite, in addition to the residual austenite. Within the range described below, the object of the present invention can be achieved.

The high-strength cold-rolled steel sheet according to the embodiment can contain ferrite of 10% to 87%, tempered martensite of 1% to 50%, preferably 10% to 50%, in addition to the aforementioned residual austenite, by volume fraction within the depth range of t/8 to 3t/8 with the depth of t/4 being a center. Further, the steel sheet can have a microstructure in which the volume fraction of fresh martensite can be limited to 15% or less. As long as the microstructure of the steel sheet of the present invention (a base steel sheet in a case of a galvanized steel sheet) has such a microstructure, a high-strength cold-rolled steel sheet having a strength of 700 MPa or more and excellent bendability is obtained.

Moreover, one or more of bainitic ferrite, bainite, and pearlite may be contained. Within the range described below, the object of the present invention can be achieved.

"Tempered Martensite: 10% to 50%"

Tempered martensite improves tensile strength significantly. Therefore, tempered martensite may be contained by 50% or less in volume fraction in the structure of the base steel sheet. Tempered martensite is martensite obtained by retaining martensite at 200° C. to 500° C. and precipitating iron-based carbides such as θ, ε, and η, and hardly causes cracking compared to fresh martensite. From the viewpoint of tensile strength, the volume fraction of tempered martensite is preferably 1% or more, and more preferably 10% or more. On the other hand, when the volume fraction of tempered martensite contained in the structure of the base steel sheet is more than 50%, yield stress increases excessively and there is a concern of deteriorating shape fixability, which hence, is not preferable.

"Ferrite: 10% to 87%"

Ferrite is effective for improving ductility. Thus, ferrite may be contained by 10% or more in volume fraction in the structure of the base steel sheet. Since ferrite has a soft structure, the upper limit of ferrite may be set to 87% by volume fraction to secure a sufficient strength.

"Fresh Martensite: 15% or Less"

The fresh martensite significantly improves tensile strength. On the other hand, fresh martensite becomes a fracture origin and significantly deteriorates bendability. Accordingly, fresh martensite is preferably limited to 15% or less by volume fraction in the structure of the base steel sheet. To increase bendability, the volume fraction of fresh martensite is more preferably 10% or less, and still more preferably 5% or less.

The fresh martensite is martensite which does not contain iron-based carbides, and is very hard and brittle. As a result, when bending is performed, the fresh martensite becomes a crack origin and deteriorates bendability significantly. Therefore, it is desirable that the volume fraction thereof be as small as possible.

"Total of Bainitic Ferrite and Bainite: 10% to 50%"

Bainitic ferrite and bainite have a structure excellent in balance between strength and ductility, have a structure having strength which is in the middle between soft ferrite and hard martensite, and tempered martensite and residual austenite, and contribute to improving balance between strength and ductility. Therefore, bainitic ferrite and bainite may be contained by 10% to 50% in total by volume fraction.

"Pearlite: 5% or Less"

When there is a large amount of pearlite, ductility deteriorates. Thus, the volume fraction of pearlite contained in the structure of the base steel sheet is preferably 5% or less, and more preferably 3% or less.

"Other Structures"

The structure of the base steel sheet of the steel sheet may contain a structure such as coarse cementite other than the above-described structures. However, when there is a large amount of coarse cementite in the structure of the base steel sheet, bendability deteriorates. Thus, the volume fraction of coarse cementite contained in the structure of the base steel sheet is preferably 10% or less, and more preferably 5% or less. The coarse cementite refers to cementite having a normal grain size of 2 μm or more. Cementite is softer than iron, and the strength of an interface between iron and cementite is also small. Thus, cementite becomes an origin of cracking or void formation during bending, and deteriorates bendability. Accordingly, the volume fraction of coarse cementite needs to be small. On the other hand, fine iron-based carbides contained in the bainite structure and the tempered martensite may be contained since the iron-based carbides do not deteriorate bendability.

As described above, the volume fraction of each structure can be measured by the following method, for example.

(Inner Microstructure)

Regarding the volume fraction of residual austenite, X-ray diffraction is performed on an observation surface which is a surface in parallel to a sheet surface of the base steel sheet and at a depth of t/4, and an area fraction is calculated, which can then be assumed as the volume fraction. Regarding the volume fractions of ferrite, pearlite, bainite, cementite, tempered martensite, and fresh martensite, a sample is collected from an observation surface which is a thicknesswise cross section parallel to a rolling direction of the base steel sheet, the observation surface is polished and etched with a nital solution, the depth range of t/8 to 3t/8 with a depth of t/4 being a center is observed with a field emission scanning electron microscope (FE-SEM), and area fractions of respective structures are measured, which can be assumed as the volume fractions of respective structures.

The reason why the measurement position of the volume fraction of each structure is set in the depth range of t/8 to 3t/8 with a depth of t/4 from the surface being a center is that the steel sheet surface has a different steel sheet structure from the steel sheet structure in the depth range of t/8 to 3t/8 due to decarburization, also has a structure in which a large amount of martensite is contained at the center of the sheet thickness due to segregation of Mn, and has remarkably different structures at other positions.

(Surface Microstructure)

On the other hand, regarding the volume fraction of residual austenite in the surface, X-ray diffraction is performed on an observation surface which is a surface in parallel to a sheet surface of the base steel sheet and at a depth of 20 μm from the surface, and an area fraction is calculated, which can then be assumed as the volume fraction. Regarding the volume fractions of ferrite, pearlite, bainite, cementite, tempered martensite, and fresh martensite, a sample is collected from an observation surface which is a thicknesswise cross section parallel to a rolling direction of the base steel sheet, the observation surface is polished, etched with a nital solution, and observed with a field emission scanning electron microscope (FE-SEM), and area fractions of respective structures are measured, which can be assumed as the volume fractions of respective structures.

(Hardness Ratio of Steel Sheet)

Next, the reason why a ratio between the hardness of the steel sheet surface and the hardness at a depth of t/4 of the base steel sheet is defined will be described.

The present inventors have found it is possible to obtain excellent bendability by performing decarburization on a steel sheet having the above-described component composition and structure and softening the steel sheet surface. That is, excellent bendability can be obtained by setting a ratio [Hvs/Hvb] between the hardness Hvs of the steel sheet surface and the hardness Hvb at a depth of t/4 of the base steel sheet satisfies: 0.75<Hvs/Hvb≤0.90.

The reason why the hardness ratio is set to more than 0.75 is that when the hardness ratio is 0.75 or less, the steel sheet is softened excessively and the maximum tensile strength of 700 MPa or more is difficult to be secured. The ratio is preferably 0.8 or more. On the other hand, when the ratio is more than 0.90, a large amount of residual austenite is contained, and thus, it is possible to suppress necking at the time of bending deformation. However, minute cracking may occur and bendability is deteriorated.

Regarding the term of "hardness" used herein, the hardness of 10 points in each of the steel sheet surface and a thicknesswise cross section parallel to the rolling direction of the steel sheet at a depth of t/4 is measured using a Vickers hardness tester with a push-in load of 10 g weight, and respective average values are obtained, which can be assumed as the hardness of each of the steel sheet surface and the cross section.

When the present inventors have investigated a relationship between bendability and steel sheet properties as a preliminary test before the investigation of a relationship between hardness and bendability, it has been found that within the depth range of t/8 to 3t/8, the average hardness is irrelevant to a position, the steel sheet structure is different at the center of the sheet thickness (a depth of t/2) due to central segregation of Mn, and the average hardness at the center of the sheet thickness is also different from the average hardness at the depth of t/8 to 3t/8. Thus, the hardness at the depth of t/4 which can be represented as the hardness of the base steel sheet is assumed as the hardness (Hvb) of the base steel sheet.

On the other hand, when a relationship between a decarburization condition and the hardness of the steel sheet surface has been investigated, it has been found that as the decarburization proceeds, the hardness of the steel sheet surface decreases and a softened region spreads in the sheet thickness direction, and the thickness of a softened layer and the degree of softness can be represented by measuring the hardness at a predetermined depth from the steel sheet surface. Thus, the hardness at a position of 20 μm from the steel sheet surface is measured, and in a case of a plated steel sheet, the hardness at a position of 20 μm from an interface between a plated layer and base iron is measured, and the measured value is assumed as the hardness (Hvs) of the steel sheet surface.

Here, the reason why the measurement position is set to a position of 20 μm from the surface is as follows.

In the softened position, the hardness of the steel sheet is Hv 100 to 400, and the indentation size is about 8 μm to 13 μm. When the measurement position was excessively close to the steel sheet surface, it was difficult to measure the accurate hardness. On the other hand, when the measurement position was greatly distant from the steel sheet surface, the softened layer was not included, and thus, it was difficult to obtain an accurate relationship between the bendability and the hardness of the steel sheet surface. Thus, the measurement position was set to a position of 20 μm from the surface.

When the hardness of the steel sheet surface is measured, in order to prevent sagging of the steel sheet surface during polishing, after an abutting plate is fixed to the steel sheet to embed resin therebetween, the steel sheet may be polished to measure the hardness.

(Configuration of Steel Sheet)

The high-strength cold-rolled steel sheet of the present invention may be any of a cold-rolled steel sheet, a hot-dip galvanized steel sheet, a galvannealed steel sheet, and an electrogalvanized steel sheet as long as the hardness of the steel sheet satisfies the above range.

The galvanized layer is not particularly limited. For example, as a hot-dip galvanized layer, a plated layer containing less than 7 mass % of Fe, and a balance consisting of Zn, Al, and unavoidable impurities can be used, and as a galvannealed layer, a plated layer containing 7 mass % to 15 mass % of Fe, and a balance consisting of Zn, Al, and unavoidable impurities can be used.

In addition, the galvanized layer may contain at least one of Pb, Sb, Si, Sn, Mg, Mn, Ni, Cr, Co, Ca, Cu, Li, Ti, Be, Si, Sr, I, Cs, and REM, or at least one of the elements may be mixed in the galvanized layer. Even when the galvannealed layer contains at least one of these elements or at least one of the elements may be mixed in the galvannealed layer, the effects of the present invention is not impaired, and there is sometimes a preferable case in which the corrosion resistance and the workability are improved depending on the content of the element.

Further, the high-strength cold-rolled steel sheet of the present invention may include a coating film containing an oxide containing phosphorus on the surface of the cold-rolled steel sheet, or on the plated layer surface of the galvanized steel sheet.

A coating film containing an oxide containing phosphorus can function as a lubricant when the steel sheet is worked and can protect the surface of the steel sheet and the galvannealed layer.

(Method for Producing Steel Sheet)

Next, a method for producing the above-described high-strength cold-rolled steel sheet will be described in detail.

In order to produce a steel sheet, first, a slab having the above-described component composition is casted. As the slab to be subjected to hot rolling, it is possible to use a continuously cast slab or a slab produced by a thin slab caster or the like. Further, a process similar to continuous casting-direct rolling (CC-DR) in which hot rolling is performed immediately after the casting may be also used.

In hot rolling of the slab, a slab heating temperature is required to be set to 1050° C. or higher to secure a finish rolling temperature of an Ar3 transformation point or higher. In addition, when the slab heating temperature is decreased, a decrease in slab heating temperature leads to excessive increase in rolling load, and there are concerns of difficulty in rolling or causing a defective shape of the base steel sheet after rolling, and the like. Although the effects of the present invention are exhibited without particularly setting the upper limit of the slab heating temperature, setting an excessively high heating temperature is not preferable in terms of being economical, and thus, the upper limit of the slab heating temperature is desirably 1350° C. or lower.

The hot rolling needs to be completed at a finish rolling temperature of an Ar3 transformation point or higher. When the finish rolling temperature is lower than the Ar3 transformation point, rolling with a two-phase region of ferrite and austenite is performed. Thus, a hot-rolled sheet structure becomes a heterogeneous duplex grain structure and the heterogeneous structure remains even after being subjected to cold rolling and continuous annealing steps, resulting in that the ductility and the bendability are deteriorated.

On the other hand, although the effects of the present invention are exhibited without particularly setting the upper limit of the finish hot rolling temperature, when an excessively high finish hot rolling temperature is set, the slab heating temperature has to be set excessively high in order to secure the temperature. Thus, the upper limit of the finish rolling temperature is desirably 1100° C. or lower.

Note that the Ar3 transformation point is calculated by the following expression using the content (mass %) of each element.

$$Ar3=901-325\times C+33\times Si-92\times (Mn+Ni/2+Cr/2+Cu/2+Mo/2)+52\times Al$$

To prevent an excessive increase in thickness of the oxide formed on the surface of the hot-rolled steel sheet and deterioration of picklability, a coiling temperature in the hot rolling is set to 750° C. or lower. To further increase picklability, the coiling temperature is preferably 720° C. or lower, and more preferably 700° C. or lower.

On the other hand, when the coiling temperature is lower than 400° C., the strength of the hot-rolled steel sheet increases excessively and makes cold rolling difficult, and thus the coiling temperature is desirably 400° C. or higher. To reduce a cold rolling load, the coiling temperature is preferably 420° C. or higher. However, even when coiling is performed at a temperature of lower than 400° C., annealing is then performed in a box-shaped furnace and the softening treatment of the hot-rolled sheet is performed, and thus, cold rolling can be performed. Thus, coiling may be performed at a temperature of lower than 400° C.

Next, the hot-rolled steel sheet thus produced is preferably subjected to pickling. The pickling is to remove oxides on the surface of the hot-rolled steel sheet, and hence is important for improving platability of the base steel sheet. Further, the pickling may be performed once or may be performed plural times separately.

The hot-rolled steel sheet after the pickling is subjected to cold rolling for the purpose of thickness adjustment and shape correction. When the cold rolling is performed, a reduction is preferably set in the range of 30% to 80% so as to obtain a base steel sheet having an excellent shape with high sheet thickness precision. When the reduction is less than 30%, it is difficult to keep the shape flat, possibly resulting in poor ductility of the final product. The reduction in the cold rolling is preferably 35% or more, and more preferably 40% or more. On the other hand, in cold rolling with a reduction of more than 80%, a cold rolling load becomes too large and makes the cold rolling difficult. Thus, the reduction is preferably 80% or less. However, even when the cold rolling is performed under a cold rolling reduction of more than 80%, it is possible to obtain excellent bendability, which is the effect of the present invention.

In the cold rolling step, the effects of the present invention are exhibited without particularly defining the number of times of rolling passes and a reduction of each rolling pass.

Next, as a heat treatment step, a annealing step is performed in which the obtained cold-rolled steel sheet is passed through an annealing line in a temperature range of (Ac1 transformation point+40)° C. to (Ac3 transformation point+50)° C. In order to obtain a steel sheet having excellent bendability, the steel sheet surface needs to be softened by performing decarburization of the surface during the annealing. The decarburization is a treatment in which C contained in the steel sheet surface is diffused into the air by allowing the atmosphere in the furnace to fall within the following range during the annealing so as to decrease the C concentration of the steel sheet surface and thus, the fraction of the hard structure is decreased.

In the present invention, the atmosphere in the furnace during the annealing is set in a range in which log (water partial pressure/hydrogen partial pressure) is −3.0 to 0.0, and decarburization is performed. By making the logarithm of the ratio between water partial pressure and hydrogen partial pressure of the atmosphere gas be −3.0 to 0.0, decarburization from the cold-rolled steel sheet surface by performing annealing is moderately facilitated.

When the logarithm of the ratio between water partial pressure and hydrogen partial pressure is less than −3.0, decarburization from the cold-rolled steel sheet surface by performing annealing becomes insufficient. To facilitate decarburization, the logarithm of the ratio between water partial pressure and hydrogen partial pressure is preferably −2.5 or more. On the other hand, when the logarithm of the ratio between water partial pressure and hydrogen partial pressure is more than 0.0, decarburization from the cold-rolled steel sheet surface by performing annealing is facilitated excessively, and there is a concern of the strength of steel sheet being insufficient. In order to secure the strength of the steel sheet, the logarithm of the ratio between water partial pressure and hydrogen partial pressure is preferably −0.3 or less. Further, preferably, the atmosphere when annealing is performed includes nitrogen, water vapor, and hydrogen and is mainly constituted of nitrogen, and oxygen may be contained in addition to nitrogen, water vapor, and hydrogen.

The reason why the temperature region during the annealing is set to (Ac1 transformation point+40)° C. to (Ac3 transformation point+50)° C. is to facilitate increasing the strength of the steel sheet by forming austenite during the annealing and changing the austenite into martensite, bainite, or residual austenite.

When the annealing temperature is lower than (Ac1 transformation point+40)° C., the volume fraction of the austenite formed during the annealing is small and it is difficult to secure a strength of 700 MPa or more. Thus, the lower limit of the annealing temperature is set to (Ac1 transformation point+40)° C.

On the other hand, setting an excessively high annealing temperature is not preferable in terms of being economical, and a roll or a production facility is significantly deteriorated. Thus, the upper limit of the annealing temperature is desirably (Ac3 transformation point+50)° C. or lower. However, it is possible to obtain excellent bendability as the effect except for economical efficiency.

Note that the Ac1 and Ac3 transformation points are calculated by the following expressions using the content (mass %) of each element.

$$Ac1=723-10.7 \times Mn-16.9 \times Ni+29.1 \times Si+16.9 \times Cr+ 6.38 \times W$$

$$Ac3=910-203 \times (C)^{0.5}-15.2 \times Ni+44.7 \times Si+104 \times +31.5 \times Mo-30 \times Mn-11 \times Cr-20 \times Cu+700 \times P+400 \times Al+ 400 \times Ti$$

In the present invention, a holding time at the above annealing temperature in the atmosphere is set to 20 seconds to 600 seconds. When the holding time is shorter than 20 seconds, the fraction of the hard structure becomes small and thus, it is difficult to secure a high strength of 700 MPa or more. That is, the austenite is formed by dissolving carbides and it takes some time to dissolve the carbides. In the annealing shorter than 20 seconds, a time for dissolving the carbides is insufficient and a sufficient amount of austenite cannot be secured. As a result, it is difficult to obtain a strength of 700 MPa or more. Thus, the lower limit of the time at the annealing temperature is set to 20 seconds. On the other hand, the holding time longer than 600 seconds is not preferable since the effect is saturated and productivity is deteriorated. Therefore, the upper limit of the annealing temperature is set to 600 seconds.

After the steel sheet is annealed, the steel sheet is cooled to a temperature range of 100-330° C. When the temperature range of the steel sheet is 700-500° C. during cooling, the average cooling rate of the steel sheet is 0.5-500° C./sec.

When the average cooling rate is lower than 0.5° C./sec in the temperature range, the holding time in the temperature range becomes longer and a large amount of ferrite and pearlite is generated. Thus, it is difficult to obtain a strength of 700 MPa or higher. On the other hand, when the cooling rate is higher than 500° C./sec, a large facility investment is required, and there is a concern of increased temperature unevenness in the sheet.

In addition, a cooling stop temperature is set to 330° C. or lower, preferably 300° C. or lower, and more preferably 250° C. or lower. Thus, martensite is formed during the cooling and a strength of 700 MPa or more is secured. The lower the cooling stop temperature is, the larger the volume fraction of martensite becomes, and the martensite is held and tempered to increase tempered martensite. However, setting an excessively low cooling stop temperature is not preferable in terms of being economical, and cooling stop temperature unevenness and further material quality unevenness are increased. Thus, the lower limit of the cooling stop temperature is desirably 100° C. or higher. The lower limit of the cooling stop temperature is desirably 130° C. or higher and more desirably 160° C. or higher.

After the cooling stops, heating is performed and the temperature is adjusted in a temperature range of 350° C. to 500° C. and holding is performed in the temperature range for 10 seconds to 1000 seconds.

The reason why the temperature range of the holding is set to 350° C. to 500° C. is to achieve high strength and bendability by tempering martensite formed during the cooling or allowing bainite transformation to proceed. The tempering is a treatment in which martensite is held in a temperature range of 350° C. to 500° C. to precipitate iron-based carbides or recover the dislocation. By performing tempering, the properties of martensite can be largely improved and bendability can be also largely improved.

However, in the holding in a temperature range of lower than 350° C., a long period of time is required for carbide precipitation and dislocation recovery, and thus, improvement of bendability cannot be facilitated. On the other hand, in the holding higher than 500° C., coarse carbides are formed at the grain boundaries, and the coarse carbides are brittle, and thus, cracking is facilitated during the bending. Alternatively, bainite transformation hardly proceeds and fresh martensite is formed in the cooling process, and bendability is deteriorated. Thus, the steel sheet needs to be held at 500° C. or lower.

Further, the reason why the holding time is set to 10 seconds to 1000 seconds is to precipitate a sufficient amount of carbides and recover the dislocation. When the holding time is shorter than 10 seconds, a tempering effect which is the effect of the present invention cannot be obtained. On the other hand, since excessive holding deteriorates productivity, setting the upper limit to 1000 seconds or shorter is preferable. In addition, bainite transformation occurs during the holding in some cases, which contributes to residual austenite stabilization.

The holding referred to in the present invention means that the steel sheet is held for the above period of time in the temperature range. Accordingly, the holding not only includes isothermal holding in the temperature range, but also slow heating and slow cooling in the temperature range.

In order to facilitate both a high strength of 980 MPa or more and excellent bendability, it is necessary to perform both surface softening due to decarburization and cooling and holding at Ms point or lower. This is because cracking is suppressed due to the surface softening and crack propagation is facilitated due to improvement of the properties of the base metal. When the surface softening is performed, cracking can be suppressed in the surface during the bending. However, cracking inside the steel sheet at the surface (just below the surface) cannot be suppressed. That is, even when the surface having the maximum strain during the bending is softened, a large strain is applied to a portion close to the surface, and cracking occurs from the inside of the steel sheet in some cases. Particularly, the fracture of the interface between the hard structure and the soft structure or the hard structure itself becomes a cause of cracking. Thus, it is necessary to suppress cracking from the base metal by cooling once and holding the steel sheet at Ms point or lower, and changing the hard structure to tempered martensite from fresh martensite. On the other hand, even when the base metal has a structure including ferrite, tempered martensite, residual austenite, and bainite, there is a problem in obtaining both a high strength and excellent bendability, and cracking by the surface softening has to be delayed. Therefore, it is necessary to perform both surface softening due to decarburization and cooling and holding at Ms point or lower.

When the hot-dip galvanized steel sheet is produced, after decarburization, cooling to a temperature range of 100-330° C., and holding at 350° C. to 500° C. are performed, heating to (galvanizing bath temperature −40)° C. to (galvanizing bath temperature +50)° C., or cooling is performed. The steel sheet is immersed in a hot dip galvanizing bath to perform plating.

The immersion temperature of the steel sheet is in a temperature range of (galvanizing bath temperature −40)° C. to (galvanizing bath temperature +50)° C. When the galvanizing bath immersion sheet temperature is lower than (hot dip galvanizing bath temperature −40)° C., a large amount of heat is released at the time of the steel sheet entering the galvanizing bath, and some of molten zinc is solidified to deteriorate the appearance of plating. Thus, the lower limit is set to (hot dip galvanizing bath temperature −40)° C.

However, even when the immersion temperature of the steel sheet is lower than (hot dip galvanizing bath temperature −40)° C., the steel sheet may be reheated before plating bath immersion and the sheet temperature may be increased to (hot dip galvanizing bath temperature −40)° C. or higher so that the steel sheet is immersed in the plating bath. Further, when the plating immersion temperature is higher than (hot dip galvanizing bath temperature +50)° C., the plating temperature is increased and thus causes an industrial problem. The plating bath may contain pure zinc and Fe, Mg, Mn, Si, Cr and the like, in addition to Al.

When the plated layer is subjected to alloying, the alloying is performed at 460° C. or higher. When the alloying temperature is lower than 460° C., the alloying proceeds slowly and productivity is deteriorated. When the temperature is higher than 600° C., carbides are precipitated in austenite, and the austenite is decomposed. Thus, it is difficult to secure a strength of 700 MPa or more and satisfactory bendability, and 600° C. is set as the upper limit.

The surface galvanizing of the cold-rolled steel sheet is not limited to the aforementioned hot dip galvanizing and may be performed by electro plating. In this case, the electro plating may be performed according to a typical method.

For the purpose of lubricating the surface or the like, a coating film including an oxide containing phosphorus may be formed on the surface of the cold-rolled steel sheet of the present invention or the plated layer surface of the galvanized steel sheet.

Skin pass rolling may be performed after the aforementioned annealing. At this time, the reduction is preferably within a range of 0.1% to 1.5%. When the reduction is less than 0.1% the effect is small and the control is difficult, and thus, 0.1% is set as the lower limit. When the reduction is more than 1.5%, productivity is significantly decreased and thus, 1.5% is set as the upper limit. The skin pass may be performed either in-line or off-line. In addition, the skin pass rolling can be performed under a desired reduction in a single pass or a number of passes.

EXAMPLES

The present invention will be described in further detail using examples.

In Examples 1 to 85, slabs having component compositions shown in Tables 1 and 2 were subjected to heating to 1230° C., hot rolling, cold rolling, and heat treatment under production conditions shown in Tables 3 to 6 to produce cold-rolled steel sheets having a thickness of 1.2 mm. In all the examples, plating was performed under plating conditions shown in Tables 5 and 6.

Tables 1 and 2 show component compositions of slab steel types of A to Y and a to d used in Examples 1 to 85. Tables 3 and 4 show the properties of the slabs, hot rolling conditions, and cold rolling conditions. Tables 5 and 6 show heat treatment conditions and plating conditions.

In Tables 1 to 6, numerical values out of the range of the present invention are underlined. In addition, in Tables 5 and 6, "-" in the columns of alloying temperature means that alloying is not performed.

When hot-dip galvanized steel sheets (GI) and galvannealed steel sheets (GA) were produced, steel sheets which were subjected to cooling and holding under the heat treatment conditions shown in Tables 5 and 6 was immersed, and then cooled to room temperature. The density of effective Al in the plating bath in the plating bath was set in a range of 0.07 mass % to 0.17 mass %. Some of the steel sheets were immersed in a galvanized bath, subjected to alloying according to each condition, and then, cooled to room temperature. At this time, the basis weight was set to about 35 g/m$^2$ for both surfaces. At last, the obtained steel sheets were subjected to skin pass rolling under a reduction of 0.4%.

After degreasing, the cold-rolled steel sheets according to Examples 13, 61, and 79 were subjected to electrogalvanizing to obtain electrogalvanized steel sheets (EG). The plating conditions were as follows. Electrolytic pickling was performed at a current density of 15 A/dm$^2$ in a solution of 8 wt % of sulfuric acid at 50° C. for about 12 seconds, and plating was performed in a Zn plating bath in Example 13, a Zn—Ni plating bath in Example 61, and a Zn—Co plating bath in Example 79. The plating amount was set to 30 g/m$^2$ and 60 g/m$^2$. The plating bath temperature was set to 50±2° C., the current density was set to 60 A/dm$^2$, and the flow rate of the plating solution was set to 1 m/sec.

An aqueous solution of pH 1 to 7 containing phosphoric acid and hydrogen peroxide was applied to the surfaces of the cold-rolled steel sheet (CR) in Example 1, the hot-dip galvanized steel sheets (GI) in Examples 54 and 71, and the galvannealed steel sheet (GA) in Example 15. The weight ratio of the phosphoric acid and hydrogen peroxide in the solution was in a range of 0.1 to 10. Each surface was baked and dried at 400° C. without being washed with water and a phosphorus oxide-based inorganic coating film with a plating amount of 10 m g/m$^2$ to 500 mg/m$^2$ in terms of P content was formed.

The evaluation of bendability was performed according to JIS Z 2248 (2006) such that each of the obtained steel sheets was cut in a direction perpendicular to a rolling direction of the steel sheet, and the end surface was mechanically polished to prepare a test sample having a size of 35 mm×100 mm. For the evaluation, a 90-degree bending test was performed using a 90-degree die and a punch having a radius R of the tip end of 0.5 mm to 6 mm. After the bending test, the sample surface was observed with a magnifying lens and the minimum bending radius in which cracking does not occur was defined as a limit bending radius. A steel sheet in which the limit bending radius is 1 mm or less and necking does not occur, or a steel sheet in which the limit bending radius is 0.5 mm or less was defined as a steel sheet having excellent bendability.

A sample was prepared from each of the obtained steel sheets and the surface of the steel sheet (that is, the surface which is parallel to the sheet surface of the base steel sheet and at a depth of 20 μm from the surface) and the steel sheet structure at a depth of t/4 were measured by the above method. The results are shown in Tables 7 and 8. In Tables 7 and 8, F represents ferrite, γR represents residual austenite, TM represents tempered martensite, M represents fresh martensite, B represents bainite, and P represents pearlite. Carbides are counted as an area fraction of ferrite.

Further, the surface hardness (Hvs) of the steel sheet, the hardness (Hvb) at a depth of t/4, the hardness ratio (Hvs/Hvb), TS, EL, TS×EL, the minimum bending radius, Fe in the plating ("-" means that alloying is not performed), and the steel sheet types are shown in Tables 9 and 10.

In Tables 7 to 10, numerical values out of the range of the present invention are underlined. TS was measured by a tension test according to JIS Z 2241 (2011).

In Tables 9 and 10, the shapes of the steel sheets are shown in the columns of the steel sheet types, and the shapes of the steel sheets are respectively shown as follows: CR: cold-rolled steel sheet; GI: hot-dip galvanized steel sheet; GA: galvannealed steel sheet; and EG: electrogalvanized steel sheet. In addition, +P was added to a column of the steel sheet on which a phosphorus oxide-based inorganic coating film was formed.

In the examples satisfying the conditions of the present invention, both a maximum tensile strength of 700 MPa or more and excellent bendability are obtained. In addition, the balance (TS×El) between strength (TS) and total elongation (El) was 18000 (MPa·%) or more, which was satisfactory.

TABLE 1

| Steel | Ac1 °C. | Ac3 °C. | Ar3 °C. | C mass % | Si mass % | Mn mass % | P mass % | S mass % | N mass % | Al mass % |
|---|---|---|---|---|---|---|---|---|---|---|
| A | 719 | 813 | 658 | 0.134 | 0.76 | 2.46 | 0.009 | 0.0013 | 0.0024 | 0.028 |
| B | 736 | 881 | 700 | 0.156 | 1.24 | 2.16 | 0.006 | 0.0015 | 0.0039 | 0.142 |
| C | 739 | 831 | 677 | 0.186 | 1.39 | 2.29 | 0.012 | 0.0034 | 0.0021 | 0.016 |
| D | 752 | 872 | 683 | 0.171 | 1.92 | 2.49 | 0.016 | 0.0028 | 0.0032 | 0.059 |
| E | 729 | 826 | 709 | 0.209 | 1.48 | 1.88 | 0.014 | 0.0026 | 0.0042 | 0.011 |
| F | 738 | 839 | 712 | 0.182 | 1.42 | 1.82 | 0.009 | 0.0018 | 0.0025 | 0.027 |
| G | 749 | 836 | 689 | 0.179 | 1.55 | 1.83 | 0.006 | 0.0022 | 0.0027 | 0.024 |
| H | 740 | 866 | 691 | 0.164 | 1.42 | 2.24 | 0.011 | 0.0029 | 0.0033 | 0.048 |
| I | 744 | 859 | 698 | 0.162 | 1.38 | 2.04 | 0.012 | 0.0028 | 0.0024 | 0.030 |
| J | 744 | 846 | 690 | 0.168 | 1.56 | 2.27 | 0.008 | 0.0022 | 0.0030 | 0.029 |
| K | 746 | 841 | 683 | 0.189 | 1.62 | 2.28 | 0.019 | 0.0036 | 0.0031 | 0.004 |
| L | 741 | 839 | 676 | 0.182 | 1.48 | 2.34 | 0.024 | 0.0017 | 0.0026 | 0.007 |
| M | 740 | 834 | 676 | 0.185 | 1.45 | 2.32 | 0.011 | 0.0015 | 0.0048 | 0.021 |
| N | 727 | 966 | 714 | 0.154 | 0.78 | 1.73 | 0.010 | 0.0024 | 0.0034 | 0.329 |
| O | 765 | 828 | 662 | 0.187 | 1.38 | 1.82 | 0.008 | 0.0027 | 0.0030 | 0.016 |
| P | 743 | 859 | 704 | 0.152 | 1.49 | 2.16 | 0.007 | 0.0030 | 0.0029 | 0.033 |
| Q | 739 | 826 | 675 | 0.189 | 1.38 | 2.29 | 0.009 | 0.0059 | 0.0031 | 0.013 |
| R | 769 | 889 | 736 | 0.168 | 2.34 | 2.06 | 0.008 | 0.0024 | 0.0037 | 0.034 |
| S | 737 | 824 | 660 | 0.204 | 1.38 | 2.41 | 0.006 | 0.0019 | 0.0026 | 0.031 |
| T | 748 | 846 | 659 | 0.189 | 1.83 | 2.64 | 0.009 | 0.0028 | 0.0024 | 0.038 |
| U | 737 | 824 | 656 | 0.197 | 1.39 | 2.48 | 0.011 | 0.0056 | 0.0041 | 0.021 |
| V | 743 | 833 | 659 | 0.221 | 1.58 | 2.43 | 0.013 | 0.0034 | 0.0036 | 0.029 |
| W | 747 | 822 | 618 | 0.249 | 1.89 | 2.89 | 0.008 | 0.0024 | 0.0028 | 0.024 |
| X | 762 | 815 | 579 | 0.289 | 2.01 | 2.88 | 0.007 | 0.0026 | 0.0021 | 0.034 |
| Y | 729 | 1261 | 686 | 0.199 | 1.2 | 2.72 | 0.008 | 0.0024 | 0.0034 | 1.16 |
| a | 730 | 744 | 503 | <u>0.623</u> | 1.19 | 2.56 | 0.012 | 0.0008 | 0.0022 | 0.024 |
| b | 718 | 837 | 718 | <u>0.071</u> | 0.55 | 1.95 | 0.009 | 0.0033 | 0.0025 | 0.021 |
| c | 711 | 800 | 687 | 0.185 | <u>0.23</u> | 1.76 | 0.019 | 0.0026 | 0.0011 | 0.016 |
| d | 726 | 845 | 751 | 0.176 | 0.54 | <u>1.22</u> | 0.033 | 0.0016 | 0.0009 | 0.024 |

TABLE 2

| Steel | Ti mass % | Nb mass % | V mass % | Cr mass % | Ni mass % | Cu mass % | Mo mass % | W mass % | Ca mass % | Ce mass % | Mg mass % | Zr mass % | Hf mass % | REM mass % |
|---|---|---|---|---|---|---|---|---|---|---|---|---|---|---|
| A | | | | | | | | | | | | | | |
| B | | | | | | | | | | | | | | |
| C | | | | | | | | | | | | | | |
| D | | | | | | | | | | | | | | |
| E | | | | | | | 0.99 | | | | | | | |
| F | | | | | | | 0.39 | 0.22 | | | | | | |
| G | | | | | | | 0.82 | | | | | | | |
| H | 0.038 | | | | | | | | | | | | | |
| I | 0.021 | | | 0.13 | | 0.08 | | | | | | | | |
| J | | 0.019 | | | | | | | | | | | | |
| K | | | | | | | | | | | 0.0037 | | | |
| L | | | | | | | | | | | | | | 0.0056 |
| M | | | | | | | | | 0.0026 | | | | | |
| N | | | | | 0.44 | | | | | | | | | |
| O | | | 1.24 | | | | | | | | | | | |
| P | | 0.084 | | | | | | | | | | | | |
| Q | | | | | | | | | | 0.0029 | | | | |
| R | | | | | | | | | | | | 0.0054 | | |
| S | | | | | | | | | | | | | 0.0035 | |
| T | | | | | | | | 0.02 | | | | | | |
| U | | | | | | | | | | | | | | |
| V | | | | | | | | | | | | | | |
| W | | | | | | | | | | | | | | |
| X | | | 0.68 | | | | | | | | | | | |
| Y | | | | | | | | | | | | | | |
| a | | | | | | | | | | | | | | |
| b | | | | | | | | | | | | | | |
| c | | | | | | | | | | | | | | |
| d | | | | | | | | | | | | | | |

TABLE 3

| | Steel type | Slab properties | | | | | Hot rolling condition | | Cold rolling condition |
|---|---|---|---|---|---|---|---|---|---|
| | | Ac1 °C. | Ac3 °C. | Ar3 °C. | Ac1 + 40 (Reference) °C. | Ac3 + 50 (Reference) °C. | Finish rolling temperature °C. | Coiling temperature °C. | Reduction % |
| Example 1 | A | 719 | 813 | 658 | 759 | 863 | 880 | 540 | 67 |
| Example 2 | A | 719 | 813 | 658 | 759 | 863 | 890 | 600 | 67 |
| Example 3 | A | 719 | 813 | 658 | 759 | 863 | 900 | 540 | 67 |
| Example 4 | A | 719 | 813 | 658 | 759 | 863 | 940 | 620 | 67 |
| Example 5 | A | 719 | 813 | 658 | 759 | 863 | 880 | 630 | 67 |
| Example 6 | A | 719 | 813 | 658 | 759 | 863 | 920 | 600 | 67 |
| Example 7 | A | 719 | 813 | 658 | 759 | 863 | 930 | 590 | 67 |
| Example 8 | A | 719 | 813 | 658 | 759 | 863 | 940 | 600 | 67 |
| Example 9 | A | 719 | 813 | 658 | 759 | 863 | 900 | 630 | 67 |
| Example 10 | A | 719 | 813 | 658 | 759 | 863 | 920 | 590 | 67 |
| Example 11 | A | 719 | 813 | 658 | 759 | 863 | 890 | 580 | 67 |
| Example 12 | A | 719 | 813 | 658 | 759 | 863 | 900 | 600 | 67 |
| Example 13 | A | 719 | 813 | 658 | 759 | 863 | 930 | 620 | 67 |
| Example 14 | B | 736 | 881 | 700 | 776 | 931 | 940 | 620 | 60 |
| Example 15 | C | 739 | 831 | 677 | 779 | 881 | 910 | 530 | 60 |
| Example 16 | C | 739 | 831 | 677 | 779 | 881 | 920 | 550 | 60 |
| Example 17 | C | 739 | 831 | 677 | 779 | 881 | 890 | 560 | 60 |
| Example 18 | C | 739 | 831 | 677 | 779 | 881 | 900 | 600 | 60 |
| Example 19 | C | 739 | 831 | 677 | 779 | 881 | 920 | 590 | 60 |
| Example 20 | C | 739 | 831 | 677 | 779 | 881 | 880 | 620 | 60 |
| Example 21 | C | 739 | 831 | 677 | 779 | 881 | 960 | 490 | 50 |
| Example 22 | C | 739 | 831 | 677 | 779 | 881 | 920 | 500 | 50 |
| Example 23 | C | 739 | 831 | 677 | 779 | 881 | 900 | 500 | 50 |
| Example 24 | C | 739 | 831 | 677 | 779 | 881 | 890 | 570 | 60 |
| Example 25 | C | 739 | 831 | 677 | 779 | 881 | 900 | 560 | 60 |
| Example 26 | C | 739 | 831 | 677 | 779 | 881 | 900 | 600 | 60 |
| Example 27 | C | 739 | 831 | 677 | 779 | 881 | 920 | 620 | 60 |
| Example 28 | C | 739 | 831 | 677 | 779 | 881 | 890 | 590 | 60 |
| Example 29 | C | 739 | 831 | 677 | 779 | 881 | 930 | 610 | 60 |
| Example 30 | D | 752 | 872 | 683 | 792 | 922 | 960 | 480 | 50 |
| Example 31 | E | 729 | 826 | 709 | 769 | 876 | 920 | 530 | 60 |
| Example 32 | F | 738 | 839 | 712 | 778 | 889 | 890 | 510 | 50 |
| Example 33 | G | 749 | 836 | 689 | 789 | 886 | 900 | 640 | 60 |
| Example 34 | H | 740 | 866 | 691 | 780 | 916 | 900 | 620 | 60 |
| Example 35 | I | 744 | 859 | 698 | 784 | 909 | 890 | 600 | 60 |
| Example 36 | J | 744 | 846 | 690 | 784 | 896 | 910 | 460 | 50 |
| Example 37 | K | 746 | 841 | 683 | 786 | 891 | 940 | 430 | 40 |
| Example 38 | L | 741 | 839 | 676 | 781 | 889 | 890 | 560 | 50 |
| Example 39 | M | 740 | 834 | 676 | 780 | 884 | 930 | 540 | 50 |
| Example 40 | N | 727 | 966 | 714 | 767 | 1016 | 900 | 660 | 60 |
| Example 41 | O | 765 | 828 | 662 | 805 | 878 | 890 | 540 | 50 |
| Example 42 | P | 743 | 859 | 704 | 783 | 909 | 960 | 570 | 50 |
| Example 43 | Q | 739 | 826 | 675 | 779 | 876 | 890 | 540 | 50 |
| Example 44 | R | 769 | 889 | 736 | 809 | 939 | 880 | 530 | 50 |
| Example 45 | S | 737 | 824 | 660 | 777 | 874 | 920 | 430 | 50 |
| Example 46 | T | 748 | 846 | 659 | 788 | 896 | 920 | 480 | 50 |
| Example 47 | T | 748 | 846 | 659 | 788 | 896 | 930 | 540 | 50 |
| Example 48 | T | 748 | 846 | 659 | 788 | 896 | 920 | 550 | 50 |
| Example 49 | T | 748 | 846 | 659 | 788 | 896 | 900 | 530 | 40 |
| Example 50 | T | 748 | 846 | 659 | 788 | 896 | 890 | 660 | 50 |

TABLE 4

| | Steel type | Slab properties | | | | | Hot rolling condition | | Cold rolling condition |
|---|---|---|---|---|---|---|---|---|---|
| | | Ac1 °C. | Ac3 °C. | Ar3 °C. | Ac1 + 40 (Reference) °C. | Ac3 + 50 (Reference) °C. | Finish rolling temperature °C. | Coiling temperature °C. | Reduction % |
| Example 51 | T | 748 | 846 | 659 | 788 | 896 | 900 | 540 | 50 |
| Example 52 | T | 748 | 846 | 659 | 788 | 896 | 890 | 550 | 50 |
| Example 53 | T | 748 | 846 | 659 | 788 | 896 | 870 | 530 | 50 |
| Example 54 | T | 748 | 846 | 659 | 788 | 896 | 910 | 560 | 50 |
| Example 55 | T | 748 | 846 | 659 | 788 | 896 | 900 | 580 | 50 |
| Example 56 | T | 748 | 846 | 659 | 788 | 896 | 920 | 550 | 50 |
| Example 57 | T | 748 | 846 | 659 | 788 | 896 | 920 | 420 | 40 |
| Example 58 | T | 748 | 846 | 659 | 788 | 896 | 900 | 580 | 50 |
| Example 59 | T | 748 | 846 | 659 | 788 | 896 | 920 | 660 | 50 |
| Example 60 | T | 748 | 846 | 659 | 788 | 896 | 890 | 580 | 50 |
| Example 61 | T | 748 | 846 | 659 | 788 | 896 | 920 | 480 | 40 |
| Example 62 | U | 737 | 824 | 656 | 777 | 874 | 870 | 500 | 48 |

TABLE 4-continued

|  | Slab properties | | | | | Hot rolling condition | | Cold rolling |
|---|---|---|---|---|---|---|---|---|
|  | Steel type — | Ac1 ° C. | Ac3 ° C. | Ar3 ° C. | Ac1 + 40 (Reference) ° C. | Ac3 + 50 (Reference) ° C. | Finish rolling temperature ° C. | Coiling temperature ° C. | condition Reduction % |
| Example 63 | V | 743 | 833 | 659 | 783 | 883 | 940 | 530 | 48 |
| Example 64 | W | 747 | 822 | 618 | 787 | 872 | 930 | 680 | 40 |
| Example 65 | W | 747 | 822 | 618 | 787 | 872 | 880 | 560 | 48 |
| Example 66 | W | 747 | 822 | 618 | 787 | 872 | 890 | 580 | 48 |
| Example 67 | W | 747 | 822 | 618 | 787 | 872 | 910 | 600 | 48 |
| Example 68 | W | 747 | 822 | 618 | 787 | 872 | 970 | 540 | 40 |
| Example 69 | W | 747 | 822 | 618 | 787 | 872 | 920 | 550 | 40 |
| Example 70 | W | 747 | 822 | 618 | 787 | 872 | 900 | 550 | 40 |
| Example 71 | W | 747 | 822 | 618 | 787 | 872 | 1030 | 540 | 40 |
| Example 72 | W | 747 | 822 | 618 | 787 | 872 | 920 | 590 | 48 |
| Example 73 | W | 747 | 822 | 618 | 787 | 872 | 900 | 580 | 48 |
| Example 74 | W | 747 | 822 | 618 | 787 | 872 | 870 | 470 | 40 |
| Example 75 | W | 747 | 822 | 618 | 787 | 872 | 900 | 530 | 40 |
| Example 76 | W | 747 | 822 | 618 | 787 | 872 | 920 | 550 | 40 |
| Example 77 | W | 747 | 822 | 618 | 787 | 872 | 900 | 580 | 48 |
| Example 78 | W | 747 | 822 | 618 | 787 | 872 | 870 | 560 | 48 |
| Example 79 | W | 747 | 822 | 618 | 787 | 872 | 880 | 570 | 48 |
| Example 80 | X | 762 | 815 | 579 | 802 | 865 | 920 | 530 | 60 |
| Example 81 | Y | 729 | 1261 | 686 | 769 | 1311 | 920 | 560 | 50 |
| Example 82 | a | 730 | 744 | 503 | 770 | 794 | 890 | 600 | 67 |
| Example 83 | b | 718 | 837 | 718 | 758 | 887 | 950 | 620 | 60 |
| Example 84 | c | 711 | 800 | 687 | 751 | 850 | 940 | 640 | 60 |
| Example 85 | d | 726 | 845 | 751 | 766 | 895 | 930 | 620 | 60 |

TABLE 5

|  | Heat treatment condition | | | | | | | Plating condition | | |
|---|---|---|---|---|---|---|---|---|---|---|
|  | log (Water partial pressure/ Hydrogen partial pressure) — | Temperature ° C. | Holding time s | Cooling rate from 700° C. to 500° C. after annealing ° C./s | Cooling stop temperature ° C. | Holding temperature ° C. | Holding time s | Plating bath immersion — | Alloying temperature ° C. | Remarks — |
| Example 1 | −2.3 | 800 | 100 | 45 | 250 | 400 | 250 | Not immersed | — | Example |
| Example 2 | −2.9 | 730 | 80 | 2 | 250 | 370 | 250 | Not immersed | — | Comparative Example |
| Example 3 | −2.1 | 800 | 120 | 0.1 | 250 | 380 | 250 | Not immersed | — | Comparative Example |
| Example 4 | −2.2 | 840 | 100 | 9 | 25 | 400 | 250 | Not immersed | — | Comparative Example |
| Example 5 | −2.4 | 810 | 100 | 10 | 450 | 400 | 250 | Not immersed | — | Comparative Example |
| Example 6 | −1.2 | 800 | 90 | 220 | 25 | 25 | 0 | Not immersed | — | Comparative Example |
| Example 7 | −0.9 | 800 | 100 | 7 | 200 | 380 | 230 | Immersed | — | Example |
| Example 8 | −1.8 | 810 | 160 | 10 | 230 | 420 | 60 | Immersed | 500 | Example |
| Example 9 | −3.4 | 800 | 200 | 20 | 200 | 400 | 80 | Immersed | 480 | Comparative Example |
| Example 10 | −1.1 | 720 | 120 | 8 | 250 | 400 | 70 | Immersed | 630 | Comparative Example |
| Example 11 | −1.4 | 800 | 390 | 0.1 | 230 | 400 | 60 | Immersed | 490 | Comparative Example |
| Example 12 | −0.6 | 810 | 120 | 20 | 560 | 530 | 30 | Immersed | 520 | Comparative Example |
| Example 13 | −1.0 | 820 | 100 | 50 | 260 | 380 | 420 | Not immersed | — | Example |
| Example 14 | −1.0 | 850 | 120 | 20 | 230 | 400 | 30 | Immersed | 520 | Example |
| Example 15 | −1.8 | 820 | 120 | 160 | 230 | 400 | 30 | Not immersed | — | Example |
| Example 16 | −3.8 | 780 | 140 | 200 | 200 | 380 | 300 | Not immersed | — | Comparative Example |
| Example 17 | −2.8 | 720 | 160 | 50 | 250 | 400 | 330 | Not immersed | — | Comparative Example |
| Example 18 | −2.7 | 800 | 5 | 50 | 230 | 420 | 400 | Not immersed | — | Comparative Example |
| Example 19 | −2.7 | 870 | 230 | 0.1 | 300 | 400 | 560 | Not immersed | — | Comparative Example |
| Example 20 | −2.7 | 860 | 120 | 20 | 520 | 530 | 250 | Not immersed | — | Comparative Example |
| Example 21 | −2.4 | 830 | 120 | 60 | 25 | 25 | 0 | Not immersed | — | Comparative Example |
| Example 22 | −1.6 | 840 | 150 | 11 | 220 | 400 | 60 | Immersed | — | Example |
| Example 23 | −0.4 | 820 | 120 | 12 | 200 | 380 | 60 | Immersed | 510 | Example |
| Example 24 | −3.4 | 830 | 130 | 20 | 230 | 380 | 20 | Immersed | 560 | Comparative Example |
| Example 25 | −1.3 | 730 | 5 | 50 | 340 | 400 | 120 | Immersed | 500 | Comparative Example |
| Example 26 | −1.1 | 820 | 240 | 0.1 | 330 | 400 | 360 | Immersed | 520 | Comparative Example |
| Example 27 | −1.6 | 800 | 240 | 10 | 520 | 510 | 0 | Immersed | 520 | Comparative Example |
| Example 28 | −1.2 | 840 | 220 | 8 | 220 | 400 | 60 | Immersed | 520 | Example |
| Example 29 | −0.2 | 730 | 200 | 100 | 200 | 380 | 100 | Not immersed | — | Comparative Example |
| Example 30 | −1.5 | 840 | 180 | 25 | 200 | 400 | 60 | Immersed | 530 | Example |
| Example 31 | −1.2 | 810 | 160 | 50 | 230 | 360 | 240 | Immersed | 500 | Example |
| Example 32 | −0.8 | 830 | 170 | 50 | 200 | 370 | 30 | Immersed | 520 | Example |
| Example 33 | −1.6 | 830 | 180 | 40 | 250 | 380 | 160 | Immersed | 510 | Example |

TABLE 5-continued

| | Heat treatment condition | | | | Cooling | | | Plating condition | | |
|---|---|---|---|---|---|---|---|---|---|---|
| | log (Water partial pressure/ Hydrogen partial pressure) — | Temperature ° C. | Holding time s | Cooling rate from 700° C. to 500° C. after annealing ° C./s | stop temperature ° C. | Holding temperature ° C. | Holding time s | Plating bath immersion — | Alloying temperature ° C. | Remarks — |
| Example 34 | −0.6 | 840 | 200 | 50 | 230 | 400 | 200 | Immersed | 500 | Example |
| Example 35 | −1.2 | 840 | 200 | 60 | 220 | 420 | 140 | Immersed | 520 | Example |
| Example 36 | −0.2 | 840 | 160 | 50 | 240 | 390 | 90 | Immersed | 490 | Example |
| Example 37 | −2.1 | 840 | 140 | 45 | 230 | 400 | 60 | Immersed | 510 | Example |
| Example 38 | −1.3 | 840 | 230 | 50 | 240 | 400 | 300 | Immersed | 500 | Example |
| Example 39 | −1.1 | 820 | 200 | 35 | 250 | 380 | 60 | Immersed | 510 | Example |
| Example 40 | −1.0 | 830 | 240 | 45 | 250 | 400 | 180 | Immersed | 520 | Example |
| Example 41 | −0.7 | 820 | 200 | 40 | 250 | 390 | 450 | Immersed | 500 | Example |
| Example 42 | −1.8 | 840 | 170 | 50 | 230 | 400 | 180 | Immersed | 500 | Example |
| Example 43 | −1.7 | 830 | 180 | 35 | 250 | 400 | 200 | Immersed | 490 | Example |
| Example 44 | −1.9 | 870 | 240 | 40 | 230 | 420 | 270 | Immersed | 540 | Example |
| Example 45 | −1.8 | 820 | 200 | 30 | 250 | 380 | 220 | Immersed | 470 | Example |
| Example 46 | −1.9 | 820 | 200 | 20 | 240 | 420 | 540 | Not immersed | — | Example |
| Example 47 | −3.2 | 800 | 180 | 45 | 300 | 400 | 450 | Not immersed | — | Comparative Example |
| Example 48 | −0.9 | 720 | 180 | 50 | 200 | 420 | 360 | Not immersed | — | Comparative Example |
| Example 49 | −1.2 | 760 | 5 | 40 | 250 | 390 | 420 | Not immersed | — | Comparative Example |
| Example 50 | −1.8 | 820 | 240 | 0.1 | 300 | 400 | 760 | Not immersed | — | Comparative Example |

TABLE 6

| | Heat treatment condition | | | | Cooling | | | Plating condition | | |
|---|---|---|---|---|---|---|---|---|---|---|
| | log (Water partial pressure/ Hydrogen partial pressure) — | Temperature ° C. | Holding time s | Cooling rate from 700° C. to 500° C. after annealing ° C./s | stop temperature ° C. | Holding temperature ° C. | Holding time s | Plating bath immersion — | Alloying temperature ° C. | Remarks — |
| Example 51 | −0.6 | 820 | 200 | 40 | 530 | 510 | 0 | Not immersed | — | Comparative Example |
| Example 52 | −1.0 | 830 | 230 | 30 | 25 | 25 | 0 | Not immersed | — | Comparative Example |
| Example 53 | −1.1 | 820 | 160 | 50 | 25 | 360 | 360 | Immersed | — | Comparative Example |
| Example 54 | −0.8 | 830 | 250 | 45 | 230 | 400 | 30 | Immersed | 500 | Example |
| Example 55 | −3.4 | 840 | 180 | 50 | 230 | 420 | 260 | Immersed | 520 | Comparative Example |
| Example 56 | −1.2 | 690 | 240 | 8 | 250 | 380 | 300 | Immersed | 510 | Comparative Example |
| Example 57 | −1.0 | 750 | 5 | 40 | 200 | 400 | 200 | Immersed | 490 | Comparative Example |
| Example 58 | −1.0 | 830 | 180 | 0.1 | 230 | 400 | 800 | Immersed | 500 | Comparative Example |
| Example 59 | −1.8 | 840 | 230 | 12 | 540 | 460 | 24 | Immersed | 530 | Comparative Example |
| Example 60 | −1.4 | 820 | 200 | 40 | 25 | 25 | 0 | Immersed | 520 | Comparative Example |
| Example 61 | −2.2 | 830 | 240 | 40 | 260 | 380 | 120 | Not immersed | — | Example |
| Example 62 | −1.1 | 800 | 220 | 40 | 270 | 400 | 60 | Not immersed | — | Example |
| Example 63 | −0.9 | 810 | 180 | 40 | 270 | 380 | 240 | Not immersed | — | Example |
| Example 64 | −1.4 | 820 | 200 | 10 | 260 | 380 | 540 | Not immersed | — | Example |
| Example 65 | −3.3 | 820 | 200 | 35 | 300 | 410 | 260 | Not immersed | — | Comparative Example |
| Example 66 | −1.6 | 690 | 140 | 40 | 250 | 390 | 300 | Not immersed | — | Comparative Example |
| Example 67 | −1.5 | 750 | 5 | 40 | 240 | 380 | 360 | Not immersed | — | Comparative Example |
| Example 68 | −1.1 | 820 | 400 | 0.1 | 250 | 400 | 320 | Not immersed | — | Comparative Example |
| Example 69 | −2.1 | 820 | 200 | 50 | 540 | 520 | 0 | Not immersed | — | Comparative Example |

TABLE 6-continued

| | Heat treatment condition | | | | | | Plating condition | | |
|---|---|---|---|---|---|---|---|---|---|
| | log (Water partial pressure/ Hydrogen partial pressure) — | Temperature ° C. | Holding time s | Cooling rate from 700° C. to 500° C. after annealing ° C./s | Cooling stop temperature ° C. | Holding temperature ° C. | Holding time s | Plating bath immersion — | Alloying temperature ° C. | Remarks — |
| Example 70 | −1.8 | 810 | 200 | 40 | <u>25</u> | <u>25</u> | <u>0</u> | Not immersed | — | Comparative Example |
| Example 71 | −1.6 | 810 | 180 | 20 | 260 | 400 | 280 | Immersed | — | Example |
| Example 72 | −1.8 | 830 | 200 | 10 | 270 | 380 | 240 | Immersed | 500 | Example |
| Example 73 | <u>−3.5</u> | 810 | 200 | 8 | 270 | 370 | 60 | Immersed | 510 | Comparative Example |
| Example 74 | −0.8 | <u>660</u> | 120 | 10 | 250 | 390 | 60 | Immersed | 520 | Comparative Example |
| Example 75 | −1.6 | <u>750</u> | <u>10</u> | 20 | 300 | 400 | 30 | Immersed | 500 | Comparative Example |
| Example 76 | −1.8 | 810 | 200 | <u>0.1</u> | <u>340</u> | 400 | 240 | Immersed | 540 | Comparative Example |
| Example 77 | −1.6 | 820 | 200 | 20 | <u>530</u> | <u>510</u> | <u>0</u> | Immersed | 500 | Comparative Example |
| Example 78 | −1.7 | 830 | 220 | 10 | <u>25</u> | <u>25</u> | <u>0</u> | Immersed | 510 | Comparative Example |
| Example 79 | −1.9 | 820 | 240 | 8 | 240 | 390 | 360 | Not immersed | — | Example |
| Example 80 | −0.3 | 820 | 180 | 40 | 250 | 420 | 500 | Immersed | 490 | Example |
| Example 81 | −0.6 | 870 | 180 | 40 | 220 | 390 | 260 | Immersed | 490 | Example |
| Example 82 | −2.3 | 820 | 50 | 40 | 270 | 400 | 120 | Immersed | 490 | Comparative Example |
| Example 83 | −1.6 | 800 | 30 | 16 | 280 | 400 | 120 | Immersed | 500 | Comparative Example |
| Example 84 | −1.6 | 810 | 60 | 2 | 270 | 400 | 160 | Immersed | 480 | Comparative Example |
| Example 85 | −1.9 | 790 | 30 | 2 | 300 | 380 | 120 | Immersed | 540 | Comparative Example |

TABLE 7

| | Surface microstructure | | | | | | Inner microstructure | | | | |
|---|---|---|---|---|---|---|---|---|---|---|---|
| | F area % | Residual γ area % | TM area % | M area % | B area % | P area % | F area % | Residual γ area % | TM area % | M area % | B area % | P area % |
| Example 1 | 72 | 6 | 12 | 0 | 10 | 0 | 64 | 8 | 18 | 0 | 10 | 0 |
| Example 2 | <u>100</u> | <u>0</u> | 0 | 0 | 0 | 0 | 100 | <u>0</u> | 0 | 0 | 0 | 0 |
| Example 3 | 83 | <u>0</u> | 0 | 0 | 0 | 17 | 82 | <u>0</u> | 0 | 0 | 0 | 18 |
| Example 4 | 67 | <u>1</u> | 32 | 0 | 0 | 0 | 63 | <u>2</u> | 35 | 0 | 0 | 0 |
| Example 5 | 73 | <u>2</u> | 0 | 0 | 25 | 0 | 68 | <u>3</u> | 0 | 0 | 29 | 0 |
| Example 6 | 75 | <u>1</u> | 0 | 24 | 0 | 0 | 69 | <u>1</u> | 0 | 30 | 0 | 0 |
| Example 7 | 73 | 5 | 14 | 0 | 8 | 0 | 68 | 6 | 19 | 0 | 7 | 0 |
| Example 8 | 71 | 6 | 13 | 0 | 10 | 0 | 67 | 8 | 15 | 1 | 9 | 0 |
| Example 9 | 63 | <u>11</u> | 17 | 0 | 9 | 0 | 68 | 7 | 18 | 0 | 7 | 0 |
| Example 10 | <u>100</u> | <u>0</u> | 0 | 0 | 0 | 0 | 100 | <u>0</u> | 0 | 0 | 0 | 0 |
| Example 11 | 88 | <u>0</u> | 0 | 0 | 0 | 12 | 84 | <u>0</u> | 0 | 0 | 0 | 16 |
| Example 12 | 75 | <u>1</u> | 0 | 19 | 5 | 0 | 68 | <u>1</u> | 0 | 28 | 3 | 0 |
| Example 13 | 68 | 6 | 7 | 0 | 19 | 0 | 66 | 9 | 10 | 0 | 15 | 0 |
| Example 14 | 74 | 5 | 4 | 0 | 17 | 0 | 70 | 8 | 4 | 0 | 18 | 0 |
| Example 15 | 53 | 6 | 28 | 0 | 13 | 0 | 42 | 8 | 39 | 1 | 10 | 0 |
| Example 16 | 44 | <u>11</u> | 38 | 0 | 7 | 0 | 45 | 9 | 41 | 0 | 5 | 0 |
| Example 17 | <u>100</u> | <u>0</u> | 0 | 0 | 0 | 0 | 100 | <u>0</u> | 0 | 0 | 0 | 0 |
| Example 18 | <u>100</u> | <u>0</u> | 0 | 0 | 0 | 0 | 83 | <u>1</u> | 0 | 2 | 5 | 9 |
| Example 19 | 79 | <u>0</u> | 0 | 0 | 0 | 21 | 74 | <u>0</u> | 0 | 0 | 0 | 26 |
| Example 20 | 53 | <u>2</u> | 0 | 29 | 16 | 0 | 46 | <u>3</u> | 0 | 37 | 14 | 0 |
| Example 21 | 53 | <u>2</u> | 0 | 38 | 7 | 0 | 47 | <u>2</u> | 0 | 48 | 3 | 0 |
| Example 22 | 56 | 5 | 27 | 0 | 12 | 0 | 46 | 8 | 36 | 0 | 10 | 0 |
| Example 23 | 54 | 6 | 33 | 0 | 7 | 0 | 42 | 8 | 45 | 0 | 5 | 0 |
| Example 24 | 45 | <u>12</u> | 32 | 0 | 11 | 0 | 43 | 9 | 38 | 1 | 9 | 0 |
| Example 25 | <u>100</u> | <u>0</u> | 0 | 0 | 0 | 0 | 100 | 0 | 0 | 0 | 0 | 0 |
| Example 26 | 80 | <u>0</u> | 0 | 0 | 0 | 20 | 72 | 0 | 0 | 0 | 0 | 28 |
| Example 27 | 53 | 5 | 0 | 29 | 13 | 0 | 46 | 6 | 0 | 36 | 12 | 0 |
| Example 28 | 53 | 6 | 31 | 0 | 10 | 0 | 44 | 9 | 39 | 0 | 8 | 0 |
| Example 29 | <u>95</u> | <u>0</u> | 0 | 0 | 5 | 0 | 60 | 6 | 29 | 0 | 5 | 0 |
| Example 30 | 52 | 7 | 36 | 0 | 5 | 0 | 45 | 9 | 42 | 1 | 3 | 0 |

TABLE 7-continued

|  | Surface microstructure | | | | | | Inner microstructure | | | | | |
|---|---|---|---|---|---|---|---|---|---|---|---|---|
|  | F area % | Residual γ area % | TM area % | M area % | B area % | P area % | F area % | Residual γ area % | TM area % | M area % | B area % | P area % |
| Example 31 | 55 | 7 | 28 | 1 | 9 | 0 | 40 | 11 | 40 | 2 | 7 | 0 |
| Example 32 | 58 | 6 | 27 | 0 | 9 | 0 | 43 | 9 | 40 | 1 | 7 | 0 |
| Example 33 | 57 | 6 | 26 | 0 | 11 | 0 | 44 | 9 | 36 | 0 | 11 | 0 |
| Example 34 | 58 | 5 | 30 | 0 | 7 | 0 | 43 | 9 | 42 | 0 | 6 | 0 |
| Example 35 | 55 | 7 | 31 | 0 | 7 | 0 | 44 | 9 | 42 | 0 | 5 | 0 |
| Example 36 | 56 | 6 | 30 | 0 | 8 | 0 | 44 | 10 | 40 | 0 | 6 | 0 |
| Example 37 | 49 | 7 | 30 | 0 | 14 | 0 | 43 | 9 | 37 | 0 | 11 | 0 |
| Example 38 | 55 | 6 | 26 | 0 | 13 | 0 | 44 | 8 | 35 | 1 | 12 | 0 |
| Example 39 | 52 | 7 | 25 | 0 | 16 | 0 | 43 | 9 | 33 | 0 | 15 | 0 |
| Example 40 | 58 | 4 | 30 | 1 | 7 | 0 | 45 | 7 | 40 | 3 | 5 | 0 |
| Example 41 | 59 | 5 | 24 | 0 | 12 | 0 | 44 | 8 | 35 | 0 | 13 | 0 |
| Example 42 | 59 | 5 | 30 | 1 | 5 | 0 | 43 | 9 | 42 | 1 | 5 | 0 |
| Example 43 | 55 | 4 | 26 | 0 | 15 | 0 | 39 | 9 | 38 | 0 | 14 | 0 |
| Example 44 | 66 | 5 | 22 | 0 | 7 | 0 | 46 | 11 | 37 | 1 | 5 | 0 |
| Example 45 | 56 | 5 | 26 | 0 | 13 | 0 | 41 | 9 | 38 | 0 | 12 | 0 |
| Example 46 | 44 | 6 | 34 | 0 | 16 | 0 | 33 | 10 | 43 | 0 | 14 | 0 |
| Example 47 | 38 | <u>11</u> | 19 | 8 | 24 | 0 | 35 | 9 | 21 | 11 | 24 | 0 |
| Example 48 | <u>100</u> | 0 | 0 | 0 | 0 | 0 | 100 | <u>0</u> | 0 | 0 | 0 | 0 |
| Example 49 | <u>94</u> | 0 | 0 | 1 | 4 | 1 | 92 | <u>1</u> | 0 | 2 | 2 | 3 |
| Example 50 | <u>87</u> | 0 | 0 | 0 | 0 | 13 | 83 | <u>0</u> | 0 | 0 | 0 | 17 |

TABLE 8

|  | Surface microstructure | | | | | | Inner microstructure | | | | | |
|---|---|---|---|---|---|---|---|---|---|---|---|---|
|  | F area % | Residual γ area % | TM area % | M area % | B area % | P area % | F area % | Residual γ area % | TM area % | M area % | B area % | P area % |
| Example 51 | 56 | <u>2</u> | 0 | 16 | 26 | 0 | 38 | 4 | 0 | 30 | 28 | 0 |
| Example 52 | 52 | 3 | 0 | 38 | 7 | 0 | 34 | 7 | 0 | 55 | 4 | 0 |
| Example 53 | 52 | <u>0</u> | 30 | 0 | 18 | 0 | 35 | <u>2</u> | 45 | 1 | 17 | 0 |
| Example 54 | 51 | 6 | 30 | 0 | 13 | 0 | 34 | 10 | 43 | 1 | 12 | 0 |
| Example 55 | 32 | 12 | 37 | 0 | 19 | 0 | 32 | 10 | 42 | 0 | 16 | 0 |
| Example 56 | <u>100</u> | <u>0</u> | 0 | 0 | 0 | 0 | 100 | <u>0</u> | 0 | 0 | 0 | 0 |
| Example 57 | <u>94</u> | <u>0</u> | 0 | 0 | 0 | 6 | 89 | <u>0</u> | 0 | 0 | 0 | 11 |
| Example 58 | <u>89</u> | <u>0</u> | 0 | 0 | 0 | 11 | 81 | <u>0</u> | 0 | 0 | 0 | 19 |
| Example 59 | 48 | 4 | 0 | 24 | 24 | 0 | 37 | 7 | 0 | 33 | 23 | 0 |
| Example 60 | 47 | 4 | 0 | 13 | 36 | 0 | 34 | 7 | 0 | 21 | 38 | 0 |
| Example 61 | 43 | 5 | 33 | 1 | 18 | 0 | 31 | 9 | 42 | 2 | 16 | 0 |
| Example 62 | 48 | 6 | 27 | 0 | 14 | 5 | 33 | 10 | 34 | 2 | 11 | 10 |
| Example 63 | 49 | 6 | 24 | 0 | 21 | 0 | 27 | 12 | 37 | 1 | 23 | 0 |
| Example 64 | 44 | 7 | 21 | 1 | 27 | 0 | 26 | 15 | 29 | 2 | 28 | 0 |
| Example 65 | 28 | <u>11</u> | 8 | 19 | 34 | 0 | 24 | 16 | 9 | 23 | 28 | 0 |
| Example 66 | <u>100</u> | <u>0</u> | 0 | 0 | 0 | 0 | 100 | <u>0</u> | 0 | 0 | 0 | 0 |
| Example 67 | <u>85</u> | <u>1</u> | 6 | 0 | 8 | 0 | 82 | <u>2</u> | 10 | 0 | 6 | 0 |
| Example 68 | <u>80</u> | <u>1</u> | 6 | 1 | 12 | 0 | 76 | <u>2</u> | 9 | 3 | 10 | 0 |
| Example 69 | 61 | <u>1</u> | 0 | 0 | 38 | 0 | 32 | <u>2</u> | 0 | 30 | 36 | 0 |
| Example 70 | <u>93</u> | 2 | 0 | 0 | 5 | 0 | 25 | 4 | 0 | 70 | 1 | 0 |
| Example 71 | 40 | 10 | 23 | 1 | 26 | 0 | 25 | 16 | 30 | 2 | 27 | 0 |
| Example 72 | 41 | 11 | 18 | 1 | 29 | 0 | 26 | 17 | 24 | 3 | 30 | 0 |
| Example 73 | 29 | 12 | 22 | 0 | 37 | 0 | 25 | 18 | 25 | 1 | 31 | 0 |
| Example 74 | <u>100</u> | <u>0</u> | 0 | 0 | 0 | 0 | 100 | <u>0</u> | 0 | 0 | 0 | 0 |
| Example 75 | <u>81</u> | <u>1</u> | 4 | 0 | 14 | 0 | 78 | <u>2</u> | 9 | 2 | 9 | 0 |
| Example 76 | <u>77</u> | <u>1</u> | 3 | 1 | 18 | 0 | 75 | 4 | 7 | 2 | 12 | 0 |
| Example 77 | 41 | <u>2</u> | 0 | 18 | 39 | 0 | 26 | 8 | 0 | 28 | 38 | 0 |
| Example 78 | 44 | <u>2</u> | 0 | 47 | 7 | 0 | 23 | 5 | 0 | 68 | 4 | 0 |
| Example 79 | 36 | 3 | 30 | 1 | 30 | 0 | 25 | 4 | 38 | 2 | 31 | 0 |
| Example 80 | 60 | 8 | 11 | 0 | 21 | 0 | 23 | <u>22</u> | 25 | 2 | 28 | 0 |
| Example 81 | 51 | 8 | 16 | 0 | 25 | 0 | 42 | 12 | 23 | 0 | 23 | 0 |
| Example 82 | 40 | <u>15</u> | 0 | 16 | 29 | 0 | 4 | <u>25</u> | 0 | 34 | 37 | 0 |
| Example 83 | <u>87</u> | 4 | 1 | 0 | 8 | 0 | 84 | 6 | 2 | 0 | 8 | 0 |
| Example 84 | <u>89</u> | <u>1</u> | 0 | 0 | 7 | 3 | 88 | <u>2</u> | 0 | 0 | 4 | 6 |
| Example 85 | <u>92</u> | <u>0</u> | 0 | 0 | 6 | 2 | 92 | <u>0</u> | 0 | 0 | 3 | 5 |

TABLE 9

|  | Surface hardness Hvs | Hardness at depth of t/4 Hvb | Hardness ratio Hvs/Hvb | TS MPa | EL. % | TS * EL MPa · % | Minimum bending radius mm | Necking evaluation | Fe in plating mass % | Steel sheet type | Remarks |
|---|---|---|---|---|---|---|---|---|---|---|---|
| Example 1 | 220 | 248 | 0.89 | 799 | 31 | 24769 | 0.50 | OK | — | CR + P | Example |
| Example 2 | 156 | 176 | 0.89 | 582 | 30 | 17460 | 0.50 | OK | — | CR | Comparative Example |
| Example 3 | 175 | 209 | 0.84 | 663 | 29 | 19227 | 0.50 | OK | — | CR | Comparative Example |
| Example 4 | 237 | 271 | 0.87 | 857 | 18 | 15426 | 0.50 | NG | — | CR | Comparative Example |
| Example 5 | 172 | 211 | 0.82 | 687 | 24 | 16488 | 0.50 | OK | — | CR | Comparative Example |
| Example 6 | 203 | 272 | 0.75 | 905 | 20 | 18100 | 2.00 | NG | — | CR | Comparative Example |
| Example 7 | 200 | 248 | 0.81 | 807 | 31 | 25017 | 0.50 | OK | 2.1 | GI | Example |
| Example 8 | 224 | 249 | 0.90 | 812 | 29 | 23548 | 0.50 | OK | 10.9 | GA | Example |
| Example 9 | 249 | 246 | 1.01 | 809 | 30 | 24270 | 2.00 | OK | 9.7 | GA | Comparative Example |
| Example 10 | 142 | 190 | 0.75 | 608 | 26 | 15808 | 0.50 | OK | 18.9 | GA | Comparative Example |
| Example 11 | 173 | 207 | 0.84 | 670 | 24 | 16080 | 0.50 | OK | 10.4 | GA | Comparative Example |
| Example 12 | 204 | 272 | 0.75 | 898 | 21 | 18858 | 2.00 | NG | 12.3 | GA | Comparative Example |
| Example 13 | 183 | 240 | 0.76 | 803 | 31 | 24893 | 0.50 | OK | — | EG | Example |
| Example 14 | 202 | 248 | 0.81 | 819 | 28 | 22932 | 0.50 | OK | 11.2 | GA | Example |
| Example 15 | 256 | 306 | 0.84 | 997 | 22 | 21934 | 0.50 | OK | — | GA + P | Example |
| Example 16 | 306 | 312 | 0.98 | 1023 | 19 | 19437 | 3.00 | OK | — | CR | Comparative Example |
| Example 17 | 162 | 192 | 0.84 | 643 | 25 | 16075 | 0.50 | OK | — | CR | Comparative Example |
| Example 18 | 206 | 206 | 1.00 | 679 | 23 | 15617 | 0.50 | OK | — | CR | Comparative Example |
| Example 19 | 184 | 206 | 0.89 | 675 | 24 | 16200 | 0.50 | OK | — | CR | Comparative Example |
| Example 20 | 272 | 305 | 0.89 | 1198 | 13 | 15574 | 2.50 | OK | — | CR | Comparative Example |
| Example 21 | 332 | 371 | 0.89 | 1238 | 14 | 17332 | 2.00 | NG | — | CR | Comparative Example |
| Example 22 | 241 | 299 | 0.81 | 1009 | 21 | 21189 | 0.50 | OK | 1.9 | GI | Example |
| Example 23 | 245 | 294 | 0.83 | 1002 | 22 | 22044 | 0.50 | OK | 10.8 | GA | Example |
| Example 24 | 304 | 307 | 0.99 | 1017 | 21 | 21357 | 2.00 | NG | 14.6 | GA | Comparative Example |
| Example 25 | 166 | 192 | 0.86 | 637 | 25 | 15925 | 0.50 | OK | 9.6 | GA | Comparative Example |
| Example 26 | 168 | 209 | 0.80 | 689 | 22 | 15158 | 0.50 | OK | 11.4 | GA | Comparative Example |
| Example 27 | 332 | 373 | 0.89 | 1228 | 14 | 17192 | 2.00 | NG | 10.7 | GA | Comparative Example |
| Example 28 | 272 | 305 | 0.89 | 1006 | 21 | 21126 | 0.50 | OK | 11.1 | GA | Example |
| Example 29 | 139 | 299 | 0.46 | 650 | 23 | 14950 | 1.00 | OK | — | CR | Comparative Example |
| Example 30 | 268 | 301 | 0.89 | 998 | 22 | 21956 | 0.50 | OK | 10.3 | GA | Example |
| Example 31 | 245 | 311 | 0.79 | 1023 | 21 | 21483 | 0.50 | OK | 11.4 | GA | Example |
| Example 32 | 233 | 303 | 0.77 | 1006 | 21 | 21126 | 0.50 | OK | 10.8 | GA | Example |
| Example 33 | 246 | 314 | 0.78 | 1042 | 21 | 21882 | 0.50 | OK | 11.8 | GA | Example |
| Example 34 | 299 | 395 | 0.76 | 984 | 22 | 21648 | 0.50 | OK | 9.6 | GA | Example |
| Example 35 | 253 | 308 | 0.82 | 993 | 22 | 21846 | 0.50 | OK | 10.7 | GA | Example |
| Example 36 | 297 | 394 | 0.76 | 980 | 23 | 22540 | 0.50 | OK | 10.9 | GA | Example |
| Example 37 | 271 | 301 | 0.90 | 1002 | 21 | 21042 | 0.50 | OK | 9.4 | GA | Example |
| Example 38 | 264 | 306 | 0.86 | 1014 | 21 | 21294 | 0.50 | OK | 11.5 | GA | Example |
| Example 39 | 252 | 298 | 0.85 | 987 | 22 | 21714 | 0.50 | OK | 10.2 | GA | Example |
| Example 40 | 253 | 306 | 0.83 | 1020 | 21 | 21420 | 0.50 | OK | 11.6 | GA | Example |
| Example 41 | 230 | 301 | 0.76 | 997 | 23 | 22931 | 0.50 | OK | 10.1 | GA | Example |
| Example 42 | 238 | 302 | 0.79 | 1003 | 21 | 21063 | 0.50 | OK | 10.0 | GA | Example |
| Example 43 | 242 | 307 | 0.79 | 998 | 21 | 20958 | 0.50 | OK | 10.7 | GA | Example |
| Example 44 | 245 | 319 | 0.77 | 1034 | 20 | 20680 | 0.50 | OK | 12.3 | GA | Example |
| Example 45 | 239 | 308 | 0.78 | 1004 | 21 | 21084 | 0.50 | OK | 9.7 | GA | Example |
| Example 46 | 321 | 369 | 0.87 | 1228 | 18 | 22104 | 0.50 | OK | — | CR | Example |
| Example 47 | 369 | 364 | 1.01 | 1209 | 19 | 22971 | 2.00 | OK | — | CR | Comparative Example |
| Example 48 | 162 | 197 | 0.82 | 645 | 24 | 15480 | 0.50 | OK | — | CR | Comparative Example |
| Example 49 | 178 | 208 | 0.86 | 682 | 22 | 15004 | 0.50 | OK | — | CR | Comparative Example |
| Example 50 | 180 | 200 | 0.90 | 673 | 23 | 15479 | 0.50 | OK | — | CR | Comparative Example |

TABLE 10

|  | Surface hardness Hvs | Hardness at depth of t/4 Hvb | Hardness ratio Hvs/Hvb | TS MPa | EL. % | TS * EL MPa · % | Minimum bending radius mm | Necking evaluation | Fe in plating mass % | Steel sheet type | Remarks |
|---|---|---|---|---|---|---|---|---|---|---|---|
| Example 51 | 312 | 416 | 0.75 | 1386 | 12 | 16632 | 4.00 | OK | — | CR | Comparative Example |
| Example 52 | 368 | 448 | 0.82 | 1482 | 9 | 13338 | 6.00 | NG | — | CR | Comparative Example |
| Example 53 | 300 | 363 | 0.83 | 1207 | 12 | 14484 | 2.50 | NG | — | CR | Comparative Example |
| Example 54 | 291 | 365 | 0.80 | 1215 | 19 | 23085 | 0.50 | OK | 2.1 | GI + P | Example |
| Example 55 | 372 | 367 | 1.01 | 1220 | 19 | 23180 | 3.00 | OK | 9.6 | GA | Comparative Example |
| Example 56 | 162 | 191 | 0.85 | 639 | 24 | 15336 | 0.50 | OK | 10.4 | GA | Comparative Example |
| Example 57 | 147 | 203 | 0.72 | 675 | 21 | 14175 | 0.50 | OK | 11.2 | GA | Comparative Example |
| Example 58 | 167 | 208 | 0.80 | 682 | 24 | 16368 | 0.50 | OK | 10.8 | GA | Comparative Example |
| Example 59 | 356 | 403 | 0.88 | 1338 | 12 | 16056 | 3.00 | NG | 9.9 | GA | Comparative Example |
| Example 60 | 342 | 409 | 0.84 | 1334 | 14 | 18676 | 4.00 | NG | 10.0 | GA | Comparative Example |
| Example 61 | 333 | 372 | 0.90 | 1223 | 18 | 22014 | 0.50 | OK | — | EG | Example |
| Example 62 | 324 | 364 | 0.89 | 1206 | 18 | 21708 | 0.50 | OK | 10.4 | GA | Example |
| Example 63 | 281 | 358 | 0.78 | 1186 | 19 | 22534 | 0.50 | OK | 10.8 | GA | Example |
| Example 64 | 342 | 403 | 0.85 | 1336 | 16 | 21376 | 0.50 | OK | — | CR | Example |

TABLE 10-continued

| | Surface hardness Hvs | Hardness at depth of t/4 Hvb | Hardness ratio Hvs/Hvb | TS MPa | EL. % | TS * EL MPa · % | Minimum bending radius mm | Necking evaluation | Fe in plating mass % | Steel sheet type | Remarks |
|---|---|---|---|---|---|---|---|---|---|---|---|
| Example 65 | 432 | 416 | 1.04 | 1389 | 15 | 20835 | 4.00 | NG | — | CR | Comparative Example |
| Example 66 | 344 | 406 | 0.85 | 695 | 24 | 16680 | 0.50 | OK | — | CR | Comparative Example |
| Example 67 | 182 | 223 | 0.82 | 726 | 21 | 15246 | 0.50 | OK | — | CR | Comparative Example |
| Example 68 | 186 | 224 | 0.83 | 754 | 23 | 17342 | 0.50 | OK | — | CR | Comparative Example |
| Example 69 | 364 | 406 | 0.90 | 1346 | 16 | 21536 | 4.00 | OK | — | CR | Comparative Example |
| Example 70 | 423 | 472 | 0.90 | 1568 | 9 | 14112 | 4.00 | NG | — | CR | Comparative Example |
| Example 71 | 345 | 400 | 0.86 | 1334 | 16 | 21344 | 0.50 | OK | 1.8 | GI + P | Example |
| Example 72 | 356 | 403 | 0.88 | 1342 | 16 | 21472 | 0.50 | OK | 10.5 | GA | Example |
| Example 73 | 426 | 415 | 1.03 | 1380 | 16 | 22080 | 4.00 | NG | 10.9 | GA | Comparative Example |
| Example 74 | 142 | 203 | 0.70 | 682 | 23 | 15686 | 0.50 | OK | 11.3 | GA | Comparative Example |
| Example 75 | 179 | 226 | 0.79 | 758 | 22 | 16676 | 0.50 | OK | 10.2 | GA | Comparative Example |
| Example 76 | 192 | 231 | 0.83 | 769 | 21 | 16149 | 0.50 | OK | 10.7 | GA | Comparative Example |
| Example 77 | 352 | 405 | 0.87 | 1348 | 17 | 22916 | 4.00 | OK | 10.8 | GA | Comparative Example |
| Example 78 | 349 | 404 | 0.86 | 1346 | 12 | 16152 | 6.00 | NG | 9.4 | GA | Comparative Example |
| Example 79 | 360 | 400 | 0.90 | 1334 | 16 | 21344 | 0.50 | OK | — | EG | Example |
| Example 80 | 362 | 445 | 0.81 | 1480 | 15 | 22200 | 0.50 | OK | 9.2 | GA | Example |
| Example 81 | 257 | 321 | 0.80 | 1045 | 22 | 22990 | 0.50 | OK | 12.9 | GA | Example |
| Example 82 | 352 | 503 | 0.70 | 1763 | 4 | 7052 | 6.00 | NG | 9.2 | GA | Comparative Example |
| Example 83 | 142 | 175 | 0.81 | 585 | 34 | 19890 | 0.50 | OK | 11.3 | GA | Comparative Example |
| Example 84 | 134 | 160 | 0.84 | 535 | 29 | 15515 | 0.50 | OK | 12.8 | GA | Comparative Example |
| Example 85 | 129 | 156 | 0.83 | 525 | 30 | 15750 | 0.50 | OK | 9.8 | GA | Comparative Example |

INDUSTRIAL APPLICABILITY

According to the present invention, it is possible to provide a high-strength cold-rolled steel sheet having a tensile strength of 700 MPa or more and excellent bendability at a low cost and suitable for a structural member, a reinforcing member, and a suspension member for an automobile, which can be expected to make a significant contribution to a decrease in the weight of an automobile. Thus, the present invention has an extremely high industrial effect.

The invention claimed is:

1. A high-strength cold-rolled steel sheet consisting of, by mass %:
C: 0.075% to 0.300%;
Si: 0.30% to 2.50%;
Mn: 1.30% to 3.50%;
P: 0.001% to 0.050%;
S: 0.0001% to 0.0100%;
Al: 0.001% to 1.500%;
N: 0.0001% to 0.0100%;
Ti: 0.150% or less;
Nb: 0.150% or less;
V: 0.150% or less;
Cr: 2.00% or less;
Ni: 2.00% or less;
Cu: 2.00% or less;
Mo: 1.00% or less;
W: 1.00% or less; and
one or more of Ca, Ce, Mg, Zr, Hf and REM, wherein a total amount of the one or more of Ca, Ce, Mg, Zr, Hf and REM is 0.5000% or less; and
a balance consisting of Fe and unavoidable impurities,
wherein:
a surface microstructure, which is a microstructure in a surface of the steel sheet, contains 3% to 10% of residual austenite, 90% or less of ferrite, 15% or less of fresh martensite, and 5% or less of pearlite by volume fraction,
an inner microstructure, which is a microstructure at a depth of t/4, wherein t represents a sheet thickness of the steel sheet, contains 3% to 30% of residual austenite, 15% or less of fresh martensite, and 5% or less of pearlite by volume fraction,
the inner microstructure is different from the surface microstructure,
a ratio Hvs/Hvb between a surface hardness Hvs of the steel sheet surface and a hardness Hvb at a depth of t/4 satisfies: 0.75<Hvs/Hvb≤0.90,
a maximum tensile strength TS is 700 MPa or more,
a relationship between the maximum tensile strength TS and a total elongation EL satisfies TS×EL≥18000 (MPa·%), and
a limit bending radius evaluated by a 90-degree bending test using a 90-degree die and a punch having a radius R of a tip end of 0.5 mm to 6 mm is 1 mm or less and a necking does not occur during the 90-degree bending test, or the limit bending radius is 0.5 mm or less.

2. The high-strength cold-rolled steel sheet according to claim 1,
wherein the volume fraction of the ferrite in the surface microstructure is 10 to 87%, and
wherein the surface microstructure further contains 10% to 50% of tempered martensite by volume fraction.

3. The high-strength cold-rolled steel sheet according to claim 1,
wherein the inner microstructure further contains 10% to 87% of ferrite, and 10% to 50% of tempered martensite by volume fraction.

4. The high-strength cold-rolled steel sheet according to any one of claims 1 to 3,
wherein a coating film including an oxide containing phosphorus is formed on at least one surface.

5. The high-strength cold-rolled steel sheet according to any one of claims 1 to 3,
wherein an electrogalvanized layer is formed on at least one surface.

6. The high-strength cold-rolled steel sheet according to claim 5,
wherein a coating film including an oxide containing phosphorus is formed on the electrogalvanized layer.

7. The high-strength cold-rolled steel sheet according to any one of claims 1 to 3, wherein a galvanized layer is formed on at least one surface.

8. The high-strength cold-rolled steel sheet according to claim 7,
wherein a coating film including an oxide containing phosphorus is formed on the galvanized layer.

9. The high-strength cold-rolled steel sheet according to any one of claims 1 to 3,
wherein a galvannealed layer is formed on at least one surface.

10. The high-strength cold-rolled steel sheet according to claim 9,
wherein a coating film including an oxide containing phosphorus is formed on the galvannealed layer.

11. A method for producing the cold-rolled steel sheet according to claim 1, the method comprising:
heating a slab to 1050° C. or higher, the slab consisting of, by mass %, C: 0.075% to 0.300%; Si: 0.30% to 2.50%; Mn: 1.30% to 3.50%; P: 0.001% to 0.050%; S: 0.0001% to 0.0100%; Al: 0.001% to 1.500%; N: 0.0001% to 0.0100%; Ti: 0.150% or less; Nb: 0.150% or less; V: 0.150% or less; Cr: 2.00% or less; Ni: 2.00% or less; Cu: 2.00% or less; Mo: 1.00% or less; W: 1.00% or less; one or more of Ca, Ce, Mg, Zr, Hf and REM, wherein a total amount of the one or more of Ca, Ce, Mg, Zr, Hf and REM is 0.5000% or less; and a balance consisting of Fe and unavoidable impurities, performing hot rolling at a finish rolling temperature set to an Ar3 transformation point or higher, and then coiling in a temperature range of 750° C. or lower, to obtain a hot-rolled steel sheet;
cold-rolling the hot-rolled steel sheet under a reduction of 30% to 80% to obtain a cold-rolled steel sheet; and
annealing the cold-rolled steel sheet in a temperature range of (Ac1 transformation point +40)° C. to (Ac3 transformation point +50)° C. in an atmosphere in which log (water partial pressure/hydrogen partial pressure) is −3.0 to 0.0 for 20 seconds to 600 seconds, cooling the steel sheet to a temperature range of 100-300° C. so that a cooling rate is 0.5-500° C./sec in a temperature range of 700-500° C., and then, heating the steel sheet to 350° C. to 500° C. and holding the steel sheet at 350° C. to 500° C. for 10 seconds to 1000 seconds to obtain a high-strength cold-rolled steel sheet.

12. The method for producing a cold-rolled steel sheet according to claim 11, further comprising:
forming a coating film including an oxide containing phosphorus on at least one surface of the high-strength cold-rolled steel sheet.

13. The method for producing a cold-rolled steel sheet according to claim 11, further comprising:
forming an electrogalvanized layer on at least one surface of the high-strength cold-rolled steel sheet.

14. The method for producing a cold-rolled steel sheet according to claim 13, further comprising:
forming a coating film including an oxide containing phosphorus on the electrogalvanized layer.

15. The method for producing a cold-rolled steel sheet according to claim 11, further comprising:
forming a galvanized layer on at least ogre surface of the high-strength cold-rolled steel sheet,
wherein in the forming of the galvanized layer, the high-strength cold-rolled steel sheet is immersed in a galvanizing bath, wherein the immersion temperature of the cold-rolled steel sheet is in a temperature range of (galvanizing bath temperature −40)° C. to (galvanizing bath temperature +50)° C., and cooled.

16. The method for producing a cold-rolled steel sheet according to claim 15, further comprising:
forming a coating film including an oxide containing phosphorus on the galvanized layer.

17. The method for producing a cold-rolled steel sheet according to claim 11, further comprising:
forming a galvannealed layer on at least one surface of the high-strength cold-rolled steel sheet,
wherein in the forming of the galvannealed layer, the high-strength cold-rolled steel sheet is immersed in a galvanizing bath, wherein the immersion temperature of the cold-rolled steel sheet is in a temperature range of (galvanizing bath temperature −40)° C. to (galvanizing bath temperature +50)° C., subjected to alloying at a temperature of 460° C. or higher, and then, cooled.

18. The method for producing a cold-rolled steel sheet according to claim 17, further comprising:
forming a coating film including an oxide containing phosphorus on the galvannealed layer.

19. The high-strength cold-rolled steel sheet according to claim 1,
wherein a thickness of the high-strength cold-rolled steel sheet is 0.33 mm or more.

20. The high-strength cold-rolled steel sheet according to claim 1,
wherein a thickness of the high-strength cold-rolled steel sheet is 1.2 mm or more.

21. The high-strength cold-rolled steel sheet according to claim 1,
wherein an amount of residual austenite is 8% to 30% in the inner microstructure by volume fraction.

22. The method for producing a cold-rolled steel sheet according to claim 11,
wherein the steel sheet is cooled to 100° C. to 250° C. between annealing the cold-rolled steel sheet and holding the steel sheet.

* * * * *